US012768967B2

(12) United States Patent
Hrabe et al.

(10) Patent No.: US 12,768,967 B2
(45) Date of Patent: Oct. 20, 2026

(54) SYSTEMS, METHODS AND APPARATUSES FOR CALIBRATING SENSORS MOUNTED ON A DEVICE

(71) Applicant: Brain Corporation, San Diego, CA (US)

(72) Inventors: Thomas Hrabe, San Diego, CA (US); Matt Atlas, San Diego, CA (US); Darin Velarde, San Diego, CA (US)

(73) Assignee: Brain Corporation, San Diego, CA (US)

(*) Notice: Subject to any disclaimer, the term of this patent is extended or adjusted under 35 U.S.C. 154(b) by 27 days.

(21) Appl. No.: 18/742,789

(22) Filed: Jun. 13, 2024

(65) Prior Publication Data

US 2024/0329220 A1 Oct. 3, 2024

Related U.S. Application Data

(63) Continuation of application No. 17/142,669, filed on Jan. 6, 2021, now Pat. No. 12,050,289, which is a (Continued)

(51) Int. Cl.
*G01S 7/497* (2006.01)
*B25J 9/16* (2006.01)
(Continued)

(52) U.S. Cl.
CPC ............ *G01S 7/497* (2013.01); *B25J 9/1692* (2013.01); *B25J 9/1697* (2013.01); *B60W 50/06* (2013.01); *G05D 1/0212* (2013.01); *G05D 1/0231* (2013.01); *G05D 1/0257* (2013.01); *G05D 1/247* (2024.01); *G05D 1/249* (2024.01); *G05D 1/646* (2024.01); *H04N 13/246* (2018.05); *G01D 18/00* (2013.01); *G01S 7/4972* (2013.01); *G05D 1/0088* (2013.01); *G05D 1/227* (2024.01)

(58) Field of Classification Search
USPC ........................................................ 701/33.1
See application file for complete search history.

(56) References Cited

U.S. PATENT DOCUMENTS 5,111,401 A 5/1992 Everett, Jr. et al.
5,696,675 A 12/1997 Nakamura et al.
(Continued)

FOREIGN PATENT DOCUMENTS

CN 106597417 A 4/2017
DE 102014117104 A1 5/2016
(Continued)

OTHER PUBLICATIONS

International Search Report and Written Opinion dated Nov. 19, 2019 for PCT/US19/40237.
(Continued)

*Primary Examiner* — Paul D Lee
(74) *Attorney, Agent, or Firm* — Pierson Ferdinand LLP; Sidharth Kapoor

(57) ABSTRACT

Systems and methods for calibrating a robot's sensors are disclosed. In one exemplary implementation, an environment comprising a plurality of sensor targets and a fixed position for a robot allows for faster, more accurate calibration of a robot's sensors.

12 Claims, 17 Drawing Sheets

Related U.S. Application Data continuation of application No. PCT/US2019/040237, filed on Jul. 2, 2019.

(60) Provisional application No. 62/694,679, filed on Jul. 6, 2018.

(51) Int. Cl.

| | |
|---|---|
| ***B60W 50/06*** | (2006.01) |
| ***G05D 1/00*** | (2006.01) |
| ***G05D 1/247*** | (2024.01) |
| ***G05D 1/249*** | (2024.01) |
| ***G05D 1/646*** | (2024.01) |
| ***H04N 13/246*** | (2018.01) |
| *G01D 18/00* | (2006.01) |
| *G05D 1/227* | (2024.01) |

(56) References Cited

U.S. PATENT DOCUMENTS

| | | | |
|---|---|---|---|
| 5,758,298 | A | 5/1998 | Guldner |
| 5,793,900 | A | 8/1998 | Nourbakhsh et al. |
| 5,793,934 | A | 8/1998 | Bauer |
| 6,667,592 | B2 | 12/2003 | Jacobs et al. |
| 7,170,252 | B2 | 1/2007 | Maeki |
| 7,502,065 | B2 | 3/2009 | Nakahara |
| 7,965,890 | B2 | 6/2011 | Marcus et al. |
| 8,185,239 | B2 | 5/2012 | Teng et al. |
| 8,300,890 | B1 | 10/2012 | Gaikwad et al. |
| 8,542,875 | B2 | 9/2013 | Eswara |
| 8,903,589 | B2 | 12/2014 | Sofman et al. |
| 8,918,241 | B2 | 12/2014 | Chen et al. |
| 8,948,913 | B2 | 2/2015 | Choi et al. |
| 8,954,191 | B2 | 2/2015 | Yi et al. |
| 9,076,214 | B2 | 7/2015 | Tsutsumi |
| 9,122,948 | B1 | 9/2015 | Zhu et al. |
| 9,174,672 | B2 | 11/2015 | Zeng et al. |
| 9,192,869 | B2 | 11/2015 | Moriya |
| 9,208,384 | B2 | 12/2015 | Conwell et al. |
| 9,216,745 | B2 | 12/2015 | Beardsley et al. |
| 9,233,472 | B2 | 1/2016 | Angle et al. |
| 9,286,810 | B2 | 3/2016 | Eade et al. |
| 9,304,001 | B2 | 4/2016 | Park et al. |
| 9,380,922 | B2 | 7/2016 | Duffley et al. |
| 9,400,501 | B2 | 7/2016 | Schnittman |
| 9,404,756 | B2 | 8/2016 | Fong et al. |
| 9,519,289 | B2 | 12/2016 | Munich et al. |
| 9,534,899 | B2 | 1/2017 | Gutmann et al. |
| 9,538,892 | B2 | 1/2017 | Fong et al. |
| 9,864,377 | B2 | 1/2018 | Welty et al. |
| 9,910,444 | B2 | 3/2018 | Eade et al. |
| 9,952,053 | B2 | 4/2018 | Fong et al. |
| 10,093,021 | B2 | 10/2018 | Aghamohammadi et al. |
| 10,209,063 | B2 | 2/2019 | Anderson-Sprecher |
| 10,383,497 | B2 | 8/2019 | Han et al. |
| 10,667,664 | B2 | 6/2020 | Sheikh et al. |
| 10,678,259 | B1 | 6/2020 | Ferguson et al. |
| 11,927,965 | B2 | 3/2024 | Ebrahimi Afrouzi et al. |
| 2004/0117079 | A1 | 6/2004 | Hulden |
| 2006/0188168 | A1 | 8/2006 | Sheraizin et al. |
| 2008/0059015 | A1 | 3/2008 | Whittaker et al. |
| 2008/0294338 | A1 | 11/2008 | Doh et al. |
| 2011/0212549 | A1 | 9/2011 | Chen |
| 2012/0121161 | A1 | 5/2012 | Eade et al. |
| 2012/0140202 | A1 | 6/2012 | Rothenberger |
| 2012/0143396 | A1 | 6/2012 | Brunou et al. |
| 2015/0036027 | A1 | 2/2015 | Winterot et al. |
| 2015/0261223 | A1 | 9/2015 | Fong et al. |
| 2015/0268033 | A1 | 9/2015 | Troy et al. |
| 2017/0136626 | A1 | 5/2017 | Wang et al. |
| 2017/0221226 | A1* | 8/2017 | Shen ......................... G06T 7/80 |
| 2018/0067198 | A1* | 3/2018 | Valois ..................... G01S 17/08 |
| 2018/0194008 | A1 | 7/2018 | Namiki et al. |
| 2018/0196126 | A1 | 7/2018 | Liu et al. |
| 2019/0056483 | A1* | 2/2019 | Bradley ................ G01S 7/4815 |
| 2020/0005489 | A1 | 1/2020 | Kroeger |
| 2020/0316780 | A1* | 10/2020 | Rostrup ................. B25J 9/1692 |

FOREIGN PATENT DOCUMENTS

| | | | |
|---|---|---|---|
| EP | 1110055 | A1 | 6/2001 |
| EP | 1240562 | B1 | 6/2004 |
| EP | 2096460 | A2 | 9/2009 |
| EP | 2767846 | A1 | 8/2014 |
| EP | 2916104 | B1 | 6/2018 |
| EP | 2343615 | B1 | 10/2018 |
| JP | 3265212 | B2 | 3/2002 |
| JP | 2009216600 | A | 9/2009 |
| JP | 2009288930 | A | 12/2009 |
| JP | 5769455 | B2 | 8/2015 |
| KR | 10-2010-0027683 | A | 3/2010 |
| KR | 101048098 | B1 | 7/2011 |
| WO | 2011146259 | A2 | 11/2011 |

OTHER PUBLICATIONS

European Supplemental Search Report dated Feb. 4, 2022 for EP3818341.

Carlos Estrada, et al., Hierarchical SLAM: Real-Time Accurate Mapping of Large Environments, 21 IEEE Transactions on Robotics 588; Aug. 2005.

Tim Bailey and Hugh Durrant-Whyte, Simultaneous Localization and Mapping (SLAM): Part II, IEEE Robotics & Optimization Magazine; Sep. 2006.

Seongsoo Lee and Sukhan Lee, Embedded visual SLAM: Applications for low-cost consumer robots, 20 IEEE Robotics & Automation Magazine 83; 2013.

J.A. Castellanos, J. Montiel, J. Neira, J.D Tardos, The SPmap: A probabilistic framework for simultaneous localization and map building, 15(5) IEEE Trans. Robotics and Automation 948-952; 1999.

J. Scholz, S. Chitta, B. Marthi, M. Likhachev, Cart Pushing with a Mobile Manipulation System: Towards Navigation with Moveable Objects, IEEE International Conference on Robotics and Automation 6115-6120; 2011.

Neato XV-11.

Neato XV Signature Pro.

IRobot Roomba 880.

Karcher RoboCleaner RC3000.

The Dottie.

Orazio.

IRobot Scooba.

Kiva Systems (n/k/a Amazon Robotics).

Locus Robotics.

Google Self-Driving Car Project (n/k/a Waymo).

BMW M235i.

Avidbots ARS-2.

Avidbots Neo.

Internet Archives, WayBackMachine; http://www.neatorobotics.com/buy.html; Catured date: Jan. 23, 2010.

How Waterloo became a world-class robotics hub—The Globe and Mail; https://www.theglobeandmail.com/report-on-business/rob-magazine/how-waterloo-became-a-world-class-robotics-hub/article29784283/; Accessed Mar. 15, 2025.

News Release, iRobot Enters the Smart Home with Roomba® 980 Vacuum Cleaning Robot, Date: Sep. 16, 2015.

News Release, iRobot Expands Connected Product Line with Roomba@ 960; Date: Aug. 4, 2016.

E. Eade, P. Fong and M. E. Munich, "Monocular graph SLAM with complexity reduction," 2010 IEEE/RSJ International Conference on Intelligent Robots and Systems, Taipei, Taiwan, 2010, pp. 3017-3024.

Internet Archives, WayBackMachine; http://www.neatorobotics.com/faq.html; captured Jan. 24, 2010.

Neato XV-11 Robotic All-Floor Vacuum System; 2009.

Neato XV-11™ Vacuum User's Guide; Jan. 30, 2010.

(56) References Cited

OTHER PUBLICATIONS

Chang, Ya-Chun and Yoshio Yamamoto. "On-line path planning strategy integrated with collision and dead-lock avoidance schemes for wheeled mobile robot in indoor environments." Ind. Robot 35 (2008): 421-434.
Internet Archives, WayBackMachine; http://www.robotreviews.com/reviews/review-of-the-neato-xv-11-the-roomba-killer; Catured date: Sep. 23, 2010.
Basic Research Series: Optical Information Technology State-of-the-Art Report; Publication date 1993.
Bernard Feverjon et al., A local based approach for path planning of manipulators with a high number of degrees of freedom. Proceedings. 1987 IEEE International Conference on Robotics and Automation 4 (1987): 1152-1159.
Brett R. Fajen et al., A Dynamical Model of Visually-Guided Steering, Obstacle Avoidance, and Route Selection. International Journal of Computer Vision 54 (2003): 13-34.
Christoph Rosmann et al., Efficient Trajectory Optimization Using a Spares Model. 2013 Eur. Conf. on Mobile Robots; Sep. 2013.
Dave Ferguson et al., Planning Long Dynamically Feasible Maneuvers for Autonomous Vehicles, Int'l J. of Robotics Research, vol. 28(8); Jun. 26, 2009.
David G. Lowe, Object Recognition from Local Scale-Invariant Features; 1999.
Dieter Fox et al., The Dynamic Window Approach to Collision Avoidance, IEEE Robotics and Automation Magazine, vol. 4(1); Apr. 1997.
Francisco Amoros et al., Global Appearance Applied to Visual Map Building and Path Estimation Using Multiscale Analysis, Hindawi Publishing Corporation, Mathematical Problems in Engineering, vol. 2014 Article ID 365417; Jul. 22, 2014.
Gany Berkovic and Ehud Shafir, Optical Methods for Distance and Displacement Measurements; Sep. 11, 2012.
Handbook of Optical Systems, vol. 4: Survey of Optical Instruments; 2008.
Hani Safadi, Local Path Planning Using Virtual Potential Field, McGill University School of Computer Science; Apr. 18, 2007.
J.M. Rueger, Electronic Distance Measurement, 3rd Ed.; 1990.
J.M. Rueger, Electronic Distance Measurement, 4th Ed.; 1996.
Kazushi Nakazawa et al., Movement Control of Accompanying Robot Based on Artificial Potential Field Adapted to Dynamic Environments, Elec. Engin. in Japan, vol. 192; Feb. 2014.
Khalid Yousif et al., An Overview to Visual Odometry and Visual SLAM: Applications to Mobile Robotics, Intell. Ind. Syst. Vol. 1, 289; Nov. 13, 2015.
Laurent Itti, Christof Koch, and Ernst Niebur, A Model of Saliency-Based Visual Attention for Rapid Scene Analysis; Nov. 1998.
Lina J. Karam, Nabil G. Sadaka, Rony Ferzli, and Zoran A. Ivanovski, An Efficient Selective Perceptual-Based Super-Resolution Estimator; Dec. 2011.
Lu and Milios, Globally Consistent Range Scan Alignment for Environment Mapping, Autonomous robots, 4 Autonomous robots 333-49 (1997).
Lu Yin et al., A New Potential Field Method for Mobile Robot Path Planning in the Dynamic Environments, Asian J. of Conti ol vol. 11(2); Mar. 2009.
Matthias Nieuwenhuisen et al., Predictive Potential Field-Based Collision Avoidance for Multicopters, Remote Sensing and Spatial Information Sciences, vol. XL-1; Sep. 4, 2013.
Mejdl Safran and Steven Haar, Arduino and Android Powered Object Tracking Robot; Nov. 27, 2012.
Oscar Montiel et al., Optimal Path Planning Generation for Mobile Robots Using Parallel Evolutionary Artificial Potential Field, J. Intell. Robot Sys .; Sep. 20, 2014.
Oussama Khatib, Real-Time Obstacle Avoidance for Manipulators and Mobile Robots Int'l J. of Robotics Research, vol. 5(1); 1986.
P. Payeur, Improving Robot Path Planning Efficiency with Probabilistic Virtual Environment Models. IEEE Int'l Conf on Virtual Environments; Jul. 2004.
Peter Biber and Wolfgang StraBer, nScan-Matching: Simultaneous Matching of Multiple Scans and Application to SLAM, Proceedings 2006 IEEE International Conference on Robotics and Automation, 2006.
Pierre Melchior et al., Robust Path Planning for Mobile Robot Based on Fractional Attractive Force. 2009 American Control Conf .; Jun. 2009.
Qian Jia & Xingsong Wang, An Improved Potential Field Method for Path Planning, 2010 Chinese Control and Decision Conference; 2010.
Qian Xu, Chaitali Chakrabarti, and Lina J. Karam, A Distributed Canny Edge Detector and its Implementation on FGPA; 2011.
Richard Szeliski, Image Alignment and Stitching: A Tutorial, Foundations and Trends in Computer vol. 2; 2006.
Sean Quinlan & Oussama Khatib, Elastic Bands: Connecting Path Planning and Control, IEEE Int'l Conference on Robotics and Automation; 1998.
Srenivas Varadarajan and Lina J. Karam, An Improved Perception-Based No. Reference Objective Image Sharpness Metric Using Iterative Edge Refinement; 2008.
Srenivas Varadarajan, Chaitali Chakrabarti, Lina J. Karam, and Judit Maitinez Bauza, A Distributed Psycho-Visually Motivated Canny Edge Detector; 2010.
Srenivas Varadarajan, Lina J. Karam, and Dinei Florencio, Background Recovery from Video Sequences Using Motion Parameters; 2009.
Stachniss et al., Springer Handbook of Robotics, Chapter 46: Simultaneous Localization and Mapping, Springer (2d ed.); Jan. 1, 2016.
Prassler et al., Springer Handbook of Robotics, Chapter 65: Domestic Robots, Springer (2d ed.); Jan. 1, 2016.
Suzuki and Abe, Topological Structural Analysis of Digitized Binary Images by Border Following; 1983.
Wang Tianmiao et al., Mobile Robot Control Based on Dynamic Potential, Chinese J. of Sys. Engin. & Elec. Vol. 3; Mar. 31, 1992.
Ya-Chun Chang & Yoshio Yamamoto, Path Planning of Wheeled Mobile Robot with Simultaneous Free Space Locating Capability, Int'l Serv. Robotics; Nov. 25, 2008.
Yong K. Hwang & Narenda Ahuja, A Potential Field Approach to Path Planning, IEEE Transactions on Robotics and Automation vol. 8(1); Feb. 1992.
Wolfgang Hess et al., Real-time loop closure in 2D Lidar Slam, 2016 IEEE International Conference on Robotics and Automation; May 16-21, 2016.
Zhenyu Wu et al., Collision Avoidance for Mobile Robots Based on Artificial Potential Field and Obstacle Envelope Modelling, Assembly Automation, vol. 36(3); Aug. 1, 2016.
Kaiqi Huang, Liangsheng Wang, Tieniu Tan, and Steve Maybank, A Real-Time Object Detecting and Tracking System for Outdoor Night Surveillance; 2008.
Subramanian Saravankumar et al., Multipoint potential field method for path planning of autonomous underwater vehicles in 3D space, Intel Serv Robots 2013; Oct. 6, 2013.
Javier Minguez et al., Abstracting Vehicle Shape and Kinematic Constraints from Obstacle Avoidance Methods, Autonomous Robots, vol. 20(1); Feb. 3, 2006.
Alan Conrad Bovik, Marianna Clark, Wilson S. Geisler, Multichannel Texture Analysis Using Localized Spatial Filters; Jan. 1990.
John Canny, A Computational Approach to Edge Detection, IEEE Transactions on Pattern Analysis and Machine Intelligence, vol. PAMI- 8, No. 6; Nov. 1986.
Edwin B. Olson, Robust and Efficient Robotic Mapping, Massachusetts Institute of Technology; 2008.
Giorgio Grisetti, et al., Nonlinear Constraint Network Optimization for Efficient Map Learning, 10 IEEE Transactions on Intelligent Transportation Systems 428; Sep. 2009.
Edwin Olson, et al., Fast Iterative Alignment of Pose Graphs with Poor Initial Estimates, Proceedings of the 2006 IEE Conference on Robotics and Automation; May 2006.
John Folkesson and Henrik I. Christensen, Closing the Loop with Graphical SLAM 23 IEEE Transactions on Robotics 731; Aug. 2007.

* cited by examiner

400

| Sensor | Ideal Pose (Based on CAD Model) | | | | | | Measured Pose (Based on sensor data) | | | | | |
|---|---|---|---|---|---|---|---|---|---|---|---|---|
| Front LiDAR | $X_1$ | $Y_1$ | $Z_1$ | $Yaw_1$ | $Pitch_1$ | $Roll_1$ | $X_1'$ | $Y_2'$ | $Z_1'$ | $Yaw_1'$ | $Pitch_1'$ | $Roll_1'$ |
| Slant LiDAR | $X_2$ | $Y_2$ | $Z_2$ | $Yaw_2$ | $Pitch_2$ | $Roll_2$ | $X_2'$ | $Y_2'$ | $Z_2'$ | $Yaw_2'$ | $Pitch_2'$ | $Roll_2'$ |
| Planar LiDAR | ⋮ | ⋮ | ⋮ | ⋮ | ⋮ | ⋮ | ⋮ | ⋮ | ⋮ | ⋮ | ⋮ | ⋮ |
| Rear Depth Camera<br>⋮ | | | | | | | | | | | | |
| Sensor n | $X_n$ | $Y_n$ | $Z_n$ | $Yaw_n$ | $Pitch_n$ | $Roll_n$ | $X_n'$ | $Y_n'$ | $Z_n'$ | $Yaw_n'$ | $Pitch_n'$ | $Roll_n'$ |

FIG. 4

SYSTEMS, METHODS AND APPARATUSES FOR CALIBRATING SENSORS MOUNTED ON A DEVICE

This application is a continuation of U.S. patent Ser. No. 17/142,669 filed Jan. 6, 2021, which is a continuation of International Patent Application No. PCT/US2019/40237 filed Jul. 2, 2019 and claims the benefit of U.S. Provisional Patent Application Ser. 62/694,679 filed on Jul. 6, 2018 under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for calibrating robotic sensors.

Background

Currently, robots may be comprised of a plurality of sensors to accomplish complex tasks, which require accurate calibration. These robots may utilize these sensors to navigate their environment, identify nearby objects, and gather data about their environment. In some exemplary embodiments, calibration is done individually with each sensor. In other exemplary embodiments, a robot may contain many types of sensors, requiring different calibration methods for each. This method of calibration may require an operator to perform multiple tests in multiple locations to calibrate a robot's sensors. However, these sensors may be especially difficult and time consuming to calibrate when a robot contains many types of sensors.

By means of non-limiting illustrative examples, to calibrate a robot with multiple light detection and ranging (LIDAR) sensors may require positioning and repositioning multiple target objects around the robot to calibrate the sensors. This method of calibration may require many measurements to be taken regarding the many positions of the target object(s) which may be time consuming and inefficient. The systems, methods and apparatuses of the present disclosure improve the efficiency and accuracy of calibrating a robot's sensors utilizing an environment comprising a fixed position for the robot and a plurality of sensor targets. The plurality of targets may allow for multiple sensors of a robot and/or multiple robots to be calibrated without any additional measurements or repositioning of targets.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification.

SUMMARY

The foregoing needs are satisfied by the present disclosure, which provides for, inter alia, systems, methods and apparatuses for calibrating sensors mounted on a device, for example a robot. In some exemplary embodiments, the robot calibration system may comprise a room or space with a plurality of sensor targets at known distances. The robot will utilize its sensors to find the targets, and comparisons are made between sensor data and measurements.

Exemplary embodiments described herein have innovative features, no single one of which is indispensable or solely responsible for their desirable attributes. Without limiting the scope of the claims, some of the advantageous features will now be summarized.

In an exemplary embodiment, a robot calibration room is disclosed. According to at least one non-limiting exemplary embodiment, this room may comprise an environment further comprising one or multiple sensor targets and a locking mechanism to keep a robot in a fixed location.

In another non-limiting exemplary embodiment, the locking mechanism comprises a front chock and rear locking system.

In another non-limiting exemplary embodiment, the sensor targets may be repositioned, moved and/or exchanged for different targets, allowing them to be placed at different locations or for different sensors and/or robots to be calibrated in the same room. In other words, the room used for calibration may be recreated by an original equipment manufacturer (OEM) at their specific location in order to calibrate the sensors on their respective specific robotic device. Thereby, one skilled in the art would appreciate that the inventive concepts disclosed herein are irrespective of the OEM or a specific location where calibration of the sensors will be effectuated for a particular robot as an OEM may be able to recreate the room or setup in order to calibrate the sensors for its particular robot.

In another non-limiting exemplary embodiment, a method for calibrating a robot is disclosed. According to at least one non-limiting exemplary embodiment, the method incudes: positioning sensor targets in view of corresponding sensors, creating an ideal computer-aided design (CAD) model of the calibration environment using known positions of targets relative to the robot, locking the robot in a fixed position within the calibration environment, collecting sensor data containing the perceived location of targets, comparing sensor data to CAD model, and adjusting sensors to reduce error.

In at least one non-limiting exemplary embodiment, a sensor may perceive a target in a different location from what is measured by the operator or shown in the CAD model, in which case the operator must adjust the sensor until it perceives the target in the same location as the CAD model, with minimal error.

In another non-limiting exemplary embodiment, a non-transitory computer-readable storage apparatus having a plurality of instructions stored thereon, the instructions being executable by a specialized processing apparatus to operate a robot. According to at least one non-limiting exemplary embodiment, the processing apparatus configured to execute the instructions to activate each sensor that is to calibrate, gather data on the location of sensor targets, compare data to CAD model of environment, digitally adjust sensor and/or provide operator information to manually adjust a sensor.

According to at least one non-limiting exemplary embodiment, a specialized processing apparatus may activate sensors individually or parse a plurality of sensors that an operator desires to calibrate and calculate errors between the CAD ideal model and what each sensor perceives or receives input from its environment (i.e., the calibration room).

In another non-limiting exemplary embodiment, a separate specialized processing apparatus may be utilized to compare sensor data and provide instructions for the robot and/or operator to adjust its sensors.

In another non-limiting example embodiment, a system for calibrating at least one sensor a device is disclosed. The system comprising a memory having computer readable instructions stored thereon; and at least one processor configured to execute the computer readable instructions to, transmit a signal to the at least one sensor of a plurality of sensors to adjust position of the at least one sensor by a value, the value corresponding to a difference between a first data set and a reference data set, the first data set corresponding to a set of coordinates generated by the at least one sensor based on at least one respective reference target along a first path of the at least one sensor, and the reference data set being stored in the memory prior to the transmission of the signal. Further, the at least one processor is configured to execute the computer readable instructions to, calculate the value by comparing a respective coordinate in the first data set with a respective coordinate in the reference data set, wherein the signal is transmitted to the at least one sensor to adjust position of the at least one sensor if the value is non-zero; and receive the first data set from the at least one sensor, and store the first data set by adding a plurality of columns to a pre-existing table in the memory, the first data set corresponding to a plurality of respective coordinates. Further, wherein the at least one processor is further configured to execute the computer readable instructions to receive a second data set from a different respective sensor of the plurality of sensors, the second data set corresponding to a set of coordinates generated by the respective sensor of the plurality of sensors based on a second reference target along a second path. Wherein, the first reference target is different from the second reference target, the first data set is different from the second data set, and the second path is different from the first path. The first reference target and the second reference target being spaced apart from the device.

In another non-limiting example embodiment, a method for calibrating at least one sensor a device is disclosed. The method comprising, receiving a first data set comprising a reference data set and storing the first data set in memory; receiving a second data set comprising a set of coordinates generated by the at least one sensor based on a respective reference target along a first path of the at least one sensor, and storing the second data set in the memory; calculating a value corresponding to a difference between the first and second data sets; and transmitting an adjustment signal comprising adjustments to the at least one sensor to minimize the value. The method further comprising, calculating the value by comparing a respective coordinate in the second data set with a respective coordinate in the reference data set, wherein the signal is transmitted to the at least one sensor to adjust position of the at least one sensor if the value is non-zero. The method further comprising, receiving a third data set from a different respective sensor of the plurality of sensors, the third data set corresponding to a set of coordinates generated by the respective sensor of the plurality of sensors based on a third reference target along a third path, wherein the second reference target is different from the third reference target, the second data set is different from the third data set, the third path is different from the second path, and the second reference target and the third reference target are spaced apart from the device.

In another non-limiting example embodiment a method for operating a calibration environment for calibrating at least one sensor on a device. The method comprising, positioning at least one target along a path of the at least one sensor; measuring the position and orientation of the at least one target within the calibration environment; designating a fixed point within the calibration environment wherein the device will be positioned; creating a CAD reference model of the calibration environment comprising the measured positions of the at least one target and the fixed point; activating the at least one sensor to collect data to determine a difference value between the sensor data and the CAD reference model, the value corresponding to the position and orientation of the at least one target; and repositioning and/or replacing the at least one sensor target within the calibration environment to facilitate the calibration of different sensors and different devices. Wherein, the at least one sensor corresponds to at least one of a planar LiDAR, a slanted LiDAR, a front depth camera, a right depth camera, and a left depth camera. Wherein, each one of types of the at least one sensor includes a unique field of view. Further, the fixed point within the calibration environment is spaced apart from the at least one target, the value is based on a comparison of pose coordinates between the sensor data and the CAD reference model, and the fixed point within the calibration environment includes a rear wheel chock and the front wheel chock, the rear and front wheel chocks capable of maintaining the device in a fixed location. Additionally, the method comprises, digitally transforming the sensor data to match the CAD reference model, and adjusting a pose of the at least one sensor using either an actuator or manual adjustment by an operator.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an" and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4 is an illustrative data table of storing the measured sensor data and ideal CAD model data according to an exemplary embodiment.

Figure 1A:
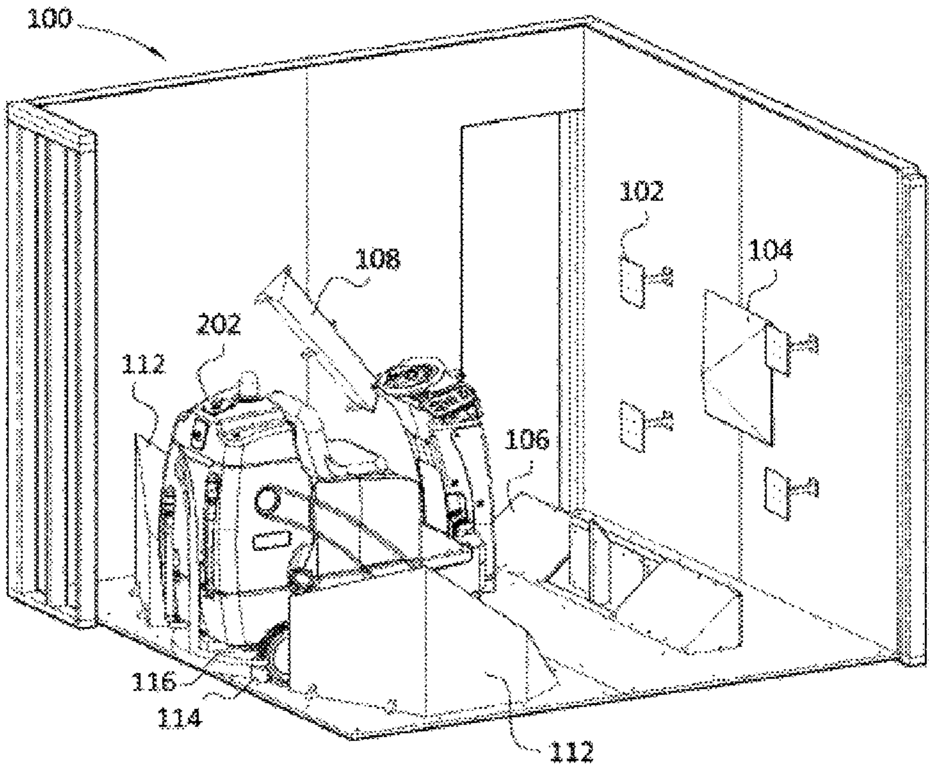
FIG. 1A is a view of a calibration environment comprising a plurality of sensor targets and a robot with at least one sensor to be calibrated according to an exemplary embodiment.

All Figures disclosed herein are © Copyright 2024 Brain Corporation. All rights reserved.

DETAILED DESCRIPTION

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented, or a method may be practiced using any number of the aspects set forth herein. In addition, the scope of the disclosure is intended to cover such an apparatus or method that is practiced using another structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved calibration methods for robot sensors. In particular, some implementations of the present disclosure relate to robots. As used herein, a robot may include mechanical and/or virtual entities configured to carry out a complex series of actions automatically. In some cases, robots may be machines that are guided and/or instructed by computer programs and/or electronic circuitry. In some cases, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a pose of a sensor comprises any or all of (x, y, z, yaw, pitch, roll) positional coordinates of the sensor. And a default pose of a sensor corresponds to an ideal (i.e., perfectly calibrated) pose of the sensor on an autonomous device such as a robot. Default poses of sensors are typically specified by manufacturers of robots, wherein deviation from the default poses may require calibration of the sensor for safe and effective operation of the robot.

Certain examples and implementations described herein with reference to robots and sensor calibration are used for illustration only, and the principles described herein may be readily applied to robotics generally.

Robots may include a plurality of sensors that must all be calibrated to ensure the robot functions properly. In cases where many sensors are present it may be undesirable to calibrate each sensor individually, especially in cases where many robots' sensors need to be calibrated quickly. A calibration environment comprising multiple sensor targets may calibrate multiple sensors at once and may be rapidly reused for multiple robots.

Detailed descriptions of the various implementations and variants of the system and methods of the disclosure are now provided. While many examples discussed herein may refer to robotic floor cleaners, it will be appreciated that the described systems and methods contained herein are applicable to any kind of robot for any purpose and/or functionality. Myriad other example implementations or uses for the technology described herein would be readily envisaged by those having ordinary skill in the art, given the contents of the present disclosure.

Advantageously, the systems and methods of this disclosure allow for: (i) faster, more efficient calibration of robots; (ii) more accurate calibration of multiple identical robots; (iii) a variety of robots may be calibrated in the same room by specifically arranging sensor targets; (iv) and reduced resource costs, such as labor, time, space, and energy associated with calibrating sensors on a robot. Other advantages are readily discernable by one having ordinary skill in the art given the contents of the present disclosure.

As used herein, a calibration room may comprise either a physical or virtual space of a calibration environment wherein the calibration environment further comprises a specific geometry of arranged sensor targets, which are discussed in further detail below.

As used herein, an operator may encompass any operator of the robotic device that may determine the tasks that the system carries out and may create a calibration environment. According to one non-limiting exemplary embodiment, an operator of the robotic device may be non-human (e.g., another robot, artificial intelligence, etc.) with the capability of instructing the robotic device what tasks to carry out (e.g., which sensor to calibrate). Additionally, the operator, human or non-human, may create a calibration environment comprising at least one sensor target, further illustrated below.

A calibration environment is disclosed, comprising a fixed location for a robot to be secured by a locking mechanism and at least one sensor target. In at least one non-limiting exemplary embodiment a robot is secured in a fixed position to ensure all identical robots are calibrated identically to the first. Additionally, having a robot in a fixed location ensures the distance between the sensors and sensor targets remains constant for additional robots tested within the same environment. In another non-limiting exemplary embodiment, these sensor targets may be positioned to calibrate one or multiple sensors at known locations within a short period of time or simultaneously. Additionally, the sensor targets may be repositioned to calibrate different sensors on different robots. Advantageously, this may allow for rapid, accurate calibration of a plurality of robots. For example, the sensor targets in the calibration environment may be reconfigured, rearranged or reoriented, in order to conform to different robots with different specifications (i.e., height, shape, width, etc.).

According to at least one non-limiting exemplary embodiment, the sensor targets may be comprised of many materials including, but not limited to, metals, plastics, cardboard, foam, and/or any material detectable by a robot's sensor units.

According to another non-limiting exemplary embodiment, the sensor targets may be positioned and repositioned using screws, bolts, latches, Velcro®, sliding mechanism (i.e., latch and key), magnets, and/or using any additional method as understood and appreciated by one skilled in the art to allow for later repositioning for calibrating different sensors and/or different robots with different specifications.

According to another non-limiting exemplary embodiment, the sensor targets may be interchangeable to allow for different sensors and/or different robots to be calibrated using the same room. Advantageously, re-arrangeable sensor targets, which may be moved between locations, greatly reduce the space and time required to calibrate a plurality of different robots and/or sensors.

According to another non-limiting exemplary embodiment, the locking mechanism may further comprise one or multiple front wheel chocks, rear wheel chocks, and a rear locking mechanism. According to another non-limiting exemplary embodiment, this rear locking mechanism may comprise a rotating armature and latch, hook, magnet, and/or any similar device as appreciated by one skilled in the art that may secure a robot in place during calibration and be released after calibration.

A method of operating a calibration environment is disclosed. According to at least one non-limiting exemplary embodiment, the method incudes: aligning sensor targets with corresponding sensors at known distances/locations, creating an ideal computer-aided design (CAD) model of the calibration environment comprising known positions of targets, locking a robot in a fixed position, collecting sensor data containing the perceived location of targets, comparing sensor data to CAD model, and adjusting sensors to reduce error.

As used herein, an ideal CAD model of a calibration environment may comprise a data structure, set of values, virtual representation of the calibration environment, etc., that correspond to ideal measurements of sensor targets by sensors of a robot within the calibration environment. That is, the ideal CAD model may correspond to an ideal baseline reference for calibration of sensors on or coupled to the robot. For example, if a robot is utilizing the systems and methods herein to calibrate a LiDAR sensor using a calibration environment, the ideal CAD model may comprise a point cloud representing ideal measurements by the LiDAR sensors of targets within the environment. Ideal measurements, as used herein, correspond to measurements by a sensor while the sensor is at a default (i.e., well calibrated) pose (i.e., (x, y, z, yaw, pitch, roll) position).

According to at least one non-limiting exemplary embodiment, an operator may measure the positions of the sensor targets to design the ideal CAD model. One skilled in the art would appreciate that the CAD model is a library of ideal or representative measurements along the plane of the respective sensor as illustrated in FIGS. 1B-C. That is, the CAD model is representative of ideal or model data for a specific plane as illustrated in table of FIG. 4.

In another one non-limiting exemplary embodiment, a sensor may perceive a target in a different location from what is measured by the operator in the calibration environment or shown in the ideal CAD model, in which case the operator may adjust the sensor until it perceives the target in the same location as the ideal CAD model, with minimal error.

In another non-limiting exemplary embodiment, the adjustment is done by a specialized processing apparatus by executing a specialized algorithm, computer code or instructions stored in a memory. In other words, positioning and orientation of sensors may be adjusted virtually by a specialized processor. In another exemplary embodiment, certain sensors may be adjusted manually by a user intervention. That is, certain sensors may be adjusted by having a user adjusting their mounts to account for errors detected during calibration.

According to at least one non-limiting exemplary embodiment, the robot may further include a non-transitory computer-readable storage medium having a plurality of instructions stored thereon, the instructions being executable by a specialized processing apparatus to operate a robot. The specialized processor is configured to execute the instructions to cause the robot to receive user input regarding which sensors activate those or all sensors, collect data comprising in part the location of each sensor target, or calibrate adjustments of the sensors.

According to at least one non-limiting exemplary embodiment, the robot may further comprise a user interface wherein an operator or user may provide the robot with an ideal CAD model of the calibration environment in which the robot is positioned or located for comparison with sensor data. Stated differently, the operator or user may upload or transmit the ideal CAD model to the robot via wireless, electric, or wired transmission. According to another non-limiting exemplary embodiment, this user interface may additionally allow for individual testing of one or a few of a robot's plurality of sensors for additional calibration.

According to at least one non-limiting exemplary embodiment, the non-transitory computer-readable storage medium further contains sensor pose data, stored in a matrix comprising positional coordinates (x, y, z) and rotational coordinates (roll, pitch, yaw) of a sensor of a robot. Similarly, the non-transitory computer readable storage medium may further comprise target pose data, stored in a matrix comprising positional (x, y, z) coordinates and rotational (roll, pitch, yaw) coordinates of a sensor target.

According to at least one non-limiting exemplary embodiment, the non-transitory computer-readable storage medium further contains computer readable instructions that, when executed by a specialized processing apparatus, applies transformations to sensor data to cause the sensor coupled or affixed to the robot to physically reorient in its position or apply a digital transformation to data from the sensor. The degree or measure of transformations of the sensor data being the difference between the ideal or representative measurements (corresponding to the CAD model) and the measurements acquired by the sensor. Based on the transformation to the sensor data, the respective sensor is either physically adjusted or digitally adjusted such that measurements acquired by the sensor in its position are equivalent to the ideal measurements by the sensor at its ideal (i.e., default) position. Such configuration allows the sensor to perceive and localize the target in its correct position. In turn, ensuring proper and correct calibration of the sensor. One skilled in the art would appreciate that this transformation may be virtual, adjusted by actuator units, and/or adjusted manually by an operator.

Figure 1B:
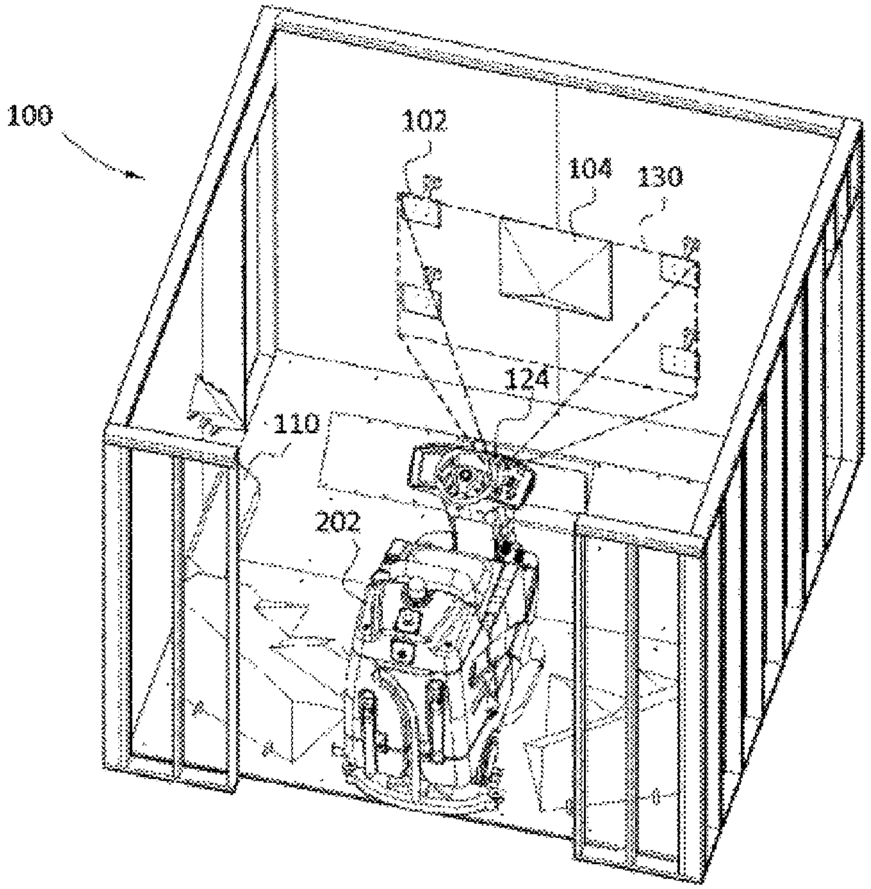
FIG. 1B is a view of a robot collecting data, using a sensor aimed at sensor targets, for calibrating the sensor according to an exemplary embodiment.
Figure 1C:
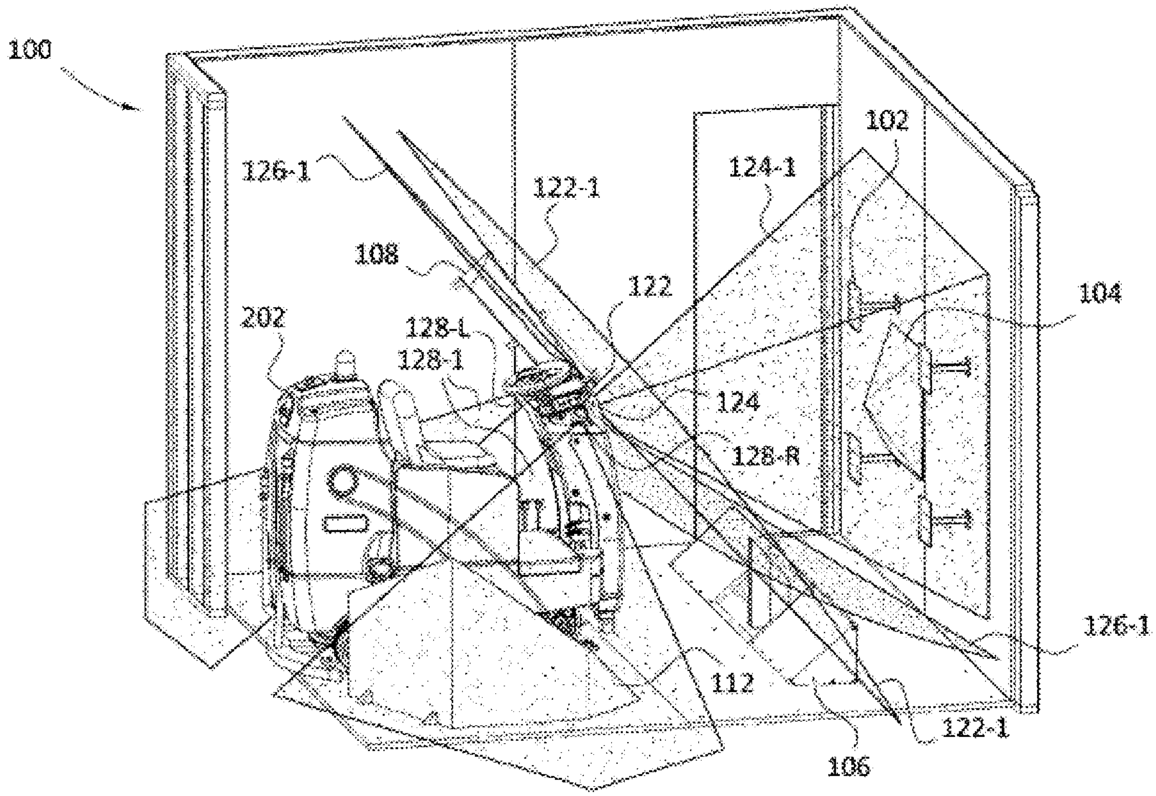
FIG. 1C is a view of the various fields of view projected by the various sensors on a robot according to an exemplary embodiment.
Figure 1D:
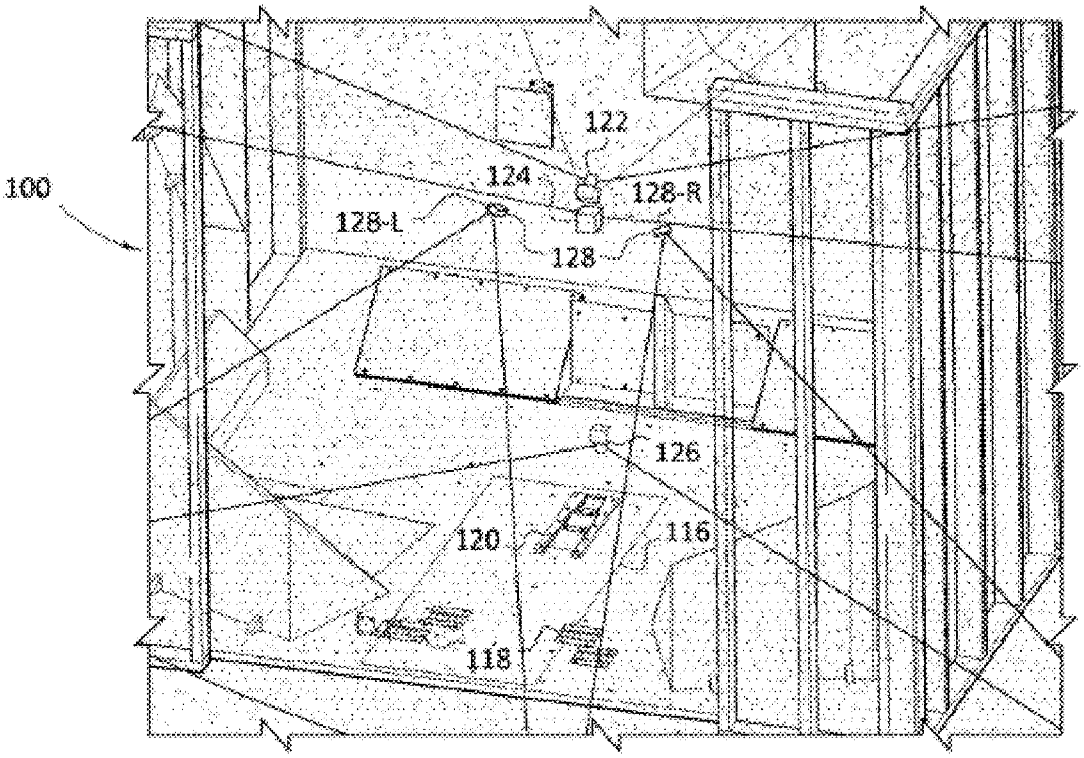
FIG. 1D is a view of the sensors used on a robotic device, without illustrating the robot, according to an exemplary embodiment.

FIG. 1A is a top view of a calibration room or calibration environment 100 according to an exemplary embodiment. One skilled in the art would appreciate that the calibration environment 100 may be within a physical space in a room or a building; or alternatively, the calibration environment 100 may be a computer-generated virtual representation of an actual physical space. The calibration environment 100 may comprise one, none, or a plurality of standoff targets 102, pyramid target 104, planar LIDAR and slanted LIDAR target 106, side slanted LIDAR targets 108, 110 (located on left and right sides of robot 202 as shown in FIG. 1B), and side depth camera targets 112 positioned just behind and on either side of the robot 202. Not illustrated in FIGS. 1A and 1B, but one skilled in the art would appreciate that side slanted LIDAR targets 110 may be placed along the wall opposite the present wall shown in FIGS. 1A and 1B. For purposes of clarity, the opposite facing side slanted LIDAR targets 108, 110, are omitted from illustration. The calibration environment 100 may further comprise a fixed position 116 for a robot 202 to be positioned during calibration, wherein fixed position 116 may further comprise a rear locking mechanism 114, rear wheel chock 118, and front wheel chock 120, as illustrated in FIG. 1D and further discussed below. One skilled in the art would appreciate that standoff targets 102, pyramid target 104, planar LIDAR and slanted LIDAR target 106, side slanted LIDAR targets 108, 110, and side depth camera targets 112, as discussed above, may be either physical structures or fixtures illustrated in FIG. 1A, or alternatively, may be digital representations or projections on a wall that provide similar functionality and purpose as the physical structures illustrated.

According to at least one non-limiting embodiment some, none, or additional targets may be added to the calibration room or environment 100 if more and/or different sensors are to be calibrated. As illustrated in FIG. 1A, fixed location 116 corresponds to securing the robot 202 in a fixed location while calibrating sensor units 214, shown in FIG. 2A. Discussed in further detail below and in reference to FIG. 2A, these sensor units 214 may include, for example, a front depth camera 124 (shown in FIG. 1C), a slanted LIDAR 122 (shown in FIG. 1C), a planar LIDAR 126 (shown in FIG. 1D), and left and right rear depth cameras 128-R and 128-L (shown in FIG. 1C).

Sensor targets 102, 104, 106, 108, 110, and 112, as discussed above, may be comprised of any material visible to the sensor units 214 of which it correspondingly calibrates. The type of material may include, but not be limited to, metal, plastic, foam, cardboard, powder coated material, matte coated materials, and/or any other material visible to the sensor. According to another non-limiting exemplary embodiment, sensor targets 102, 104, 106, 108, 110, and 112 may be different in shape, size, and/or color from the sensor targets illustrated in FIGS. 1A-E.

Next, referring to FIG. 1B, another perspective view of the calibration environment 100 is illustrated. FIG. 1B is an exemplary illustration of a robot 202 calibrating front depth camera 124 based on or using sensor targets 102 and 104. Data from front depth camera 124 may comprise distance and position measurements of sensor targets 102 and 104 that are bounded by field of view 130, or alternatively referred to as a path or plane. An operator (not shown) may utilize a user interface, further illustrated in FIGS. 7A-C, to perform a calibration on the front depth camera 124 as well as a plurality of other sensors as illustrated in FIG. 1C. As illustrated in FIGS. 1A-B, the standoff target 102 surround the pyramid target 104 and are positioned in a square type configuration around the pyramid target 104. Each one of the plurality of standoff targets 102 may be equidistant from the pyramid target 104.

FIG. 1C is an illustration of a plurality of sensors and their corresponding fields of view that aid in calibrating the plurality of sensors according to an exemplary embodiment. The plurality of sensors positioned on robot 202 comprise at least a front depth camera 124, a slanted LIDAR 122, planar LIDAR 126, and two side depth cameras 128-L (left) and 128-R (right) with respective frustum or fields of view 124-1, 122-1, 126-1, and 128-1 as illustrated. Each sensor of the plurality of sensors collects data comprising the position, orientation, and/or distance reading of at least one corresponding or respective sensor target. For example, as illustrated, front depth camera 124 may collect distance and positional measurements of sensor targets 102 and 104 that are within field of view 124-1 of the front depth camera 124. Slanted LIDAR 122 may collect data from sensor targets 108 and 106 within field of view 122-1. Side depth camera 128-R may collect data from sensor target 112 on the right side of the robot, and side depth camera 128-L may collect data from a sensor target 112 on the left side of the robot 202 (located behind robot 202, not shown in FIG. 1C). Lastly, as illustrated, planar LIDAR 126 may collect data from sensor targets 106 and 110 within field of view 126-1. Data collected by each individual sensor may be used to calibrate the corresponding sensor using methods further illustrated in the figures below. Stated differently, each respective sensor has its respective field of view that intersects or is aligned with a respective sensor target. The respective sensor is able to calibrate itself or be calibrated by an operator based on the measurements of the respective sensor target that is within the field of view of the respective sensor.

Next referring to FIG. 1D, a view of the plurality of sensors used on the robot 202 in the calibration environment 100 is illustrated according to an exemplary embodiment. For ease of understanding and purposes of clarity, robot 202 is omitted from FIG. 1D while the plurality of sensors are illustrated in order to get a clear perspective and understanding of the respective fields of views of each one of the plurality of sensors. The plurality of sensors include slanted LIDAR 122; front depth camera 124; planar LIDAR 126; and two side depth cameras 128 (left and right side) on each side that include right depth camera 128-R and left depth camera 128-L, of a device such as a robot. Additionally, as illustrated in FIG. 1D, fixed point or frame 116 may comprise front wheel chock 120 and rear wheel chocks 118 used to secure a robot 202 in fixed position within the frame 116. One skilled in the art would appreciate that FIGS. 1D and 1E do not show the device (i.e., robot) on which the plurality of sensors are placed or positioned thereon. The device (i.e., robot) is omitted from these illustrations for purposes of a clearer view of the plurality of sensors. Projections or fields of view of each of these plurality of sensors covers a certain region that is specific to where on the robot 202 the respective sensor is placed, as illustrated in FIG. 1D. As illustrated in FIG. 1D, each respective sensor of the plurality of sensors coupled or affixed to the robot include a field of view that includes at least one or more sensor targets.

Figure 1E:
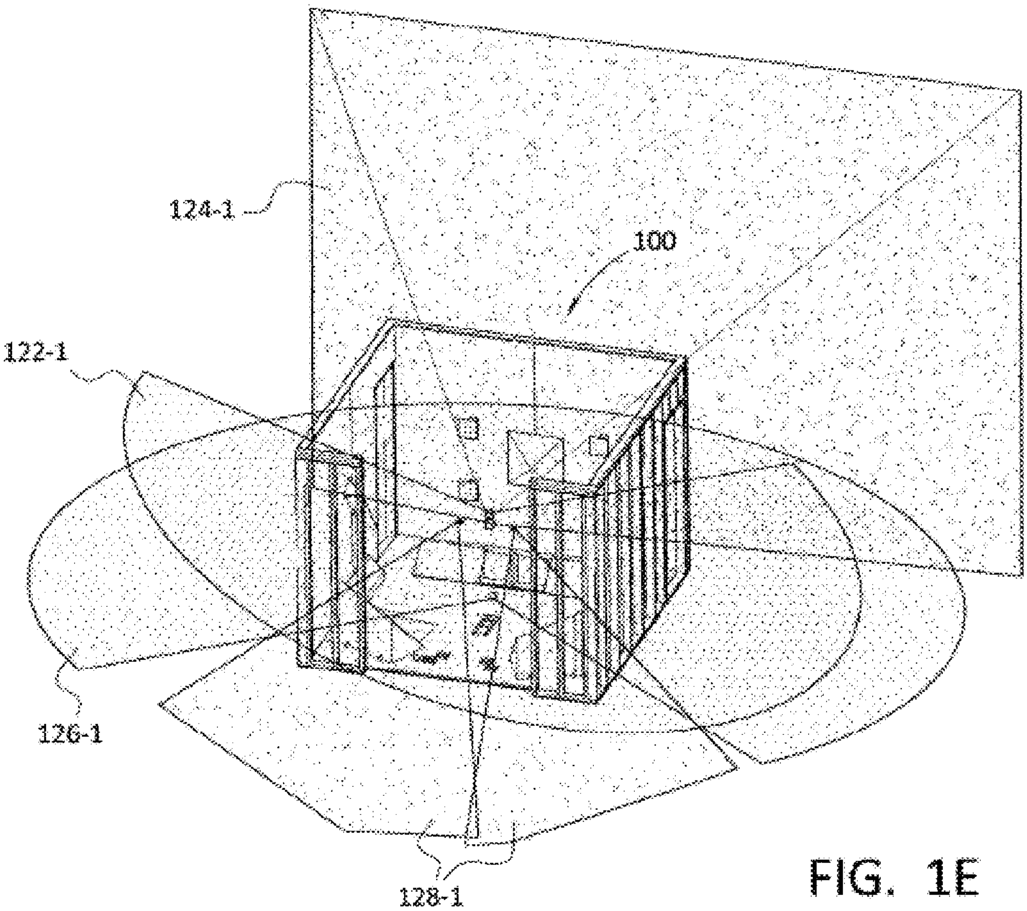
FIG. 1E is another view of the various fields of view projected by the various sensors shown in FIG. 1D according to an exemplary embodiment.

Next, referring to FIG. 1E the slanted LIDAR 122 collects data from targets along planar field of view 122-1. The targets along planar field of view 122-1 include, for example, sensor targets 106, 108. The front depth camera 124 collects data from targets along field of view 124-1. The targets along field of view 124-1 include, for example, sensor targets 102, 104. The planar LIDAR 126 collects data from sensor targets along planar field of view 126-1. The sensor targets along planar field of view 126-1 includes, for example, sensor targets 106, 110. And, lastly, the side depth cameras 128-R, 128-L collect data from sensor targets along their respective field of view 128-1. Field of view 128-1 being commonly annotated for fields of view for both right and left depth cameras, 128-R, 128-L. The sensor targets along field of view 128-1 include, for example, sensor targets 110, 112. Accordingly, based on these specific field of views for each respective sensor, data from a specific target is achieved. With respect to the CAD model as discussed above and in detail below with respect to FIG. 4, it is representative of data corresponding to respective fields of view 122-1, 124-1, 126-1 and 128-1. One skilled in the art would appreciate that the respective fields of views illustrated in FIGS. 1C, 1D and 1E, or alternatively referred to as paths or planes, may include overlapping portions or segments with respect to each other.

Figure 2A:
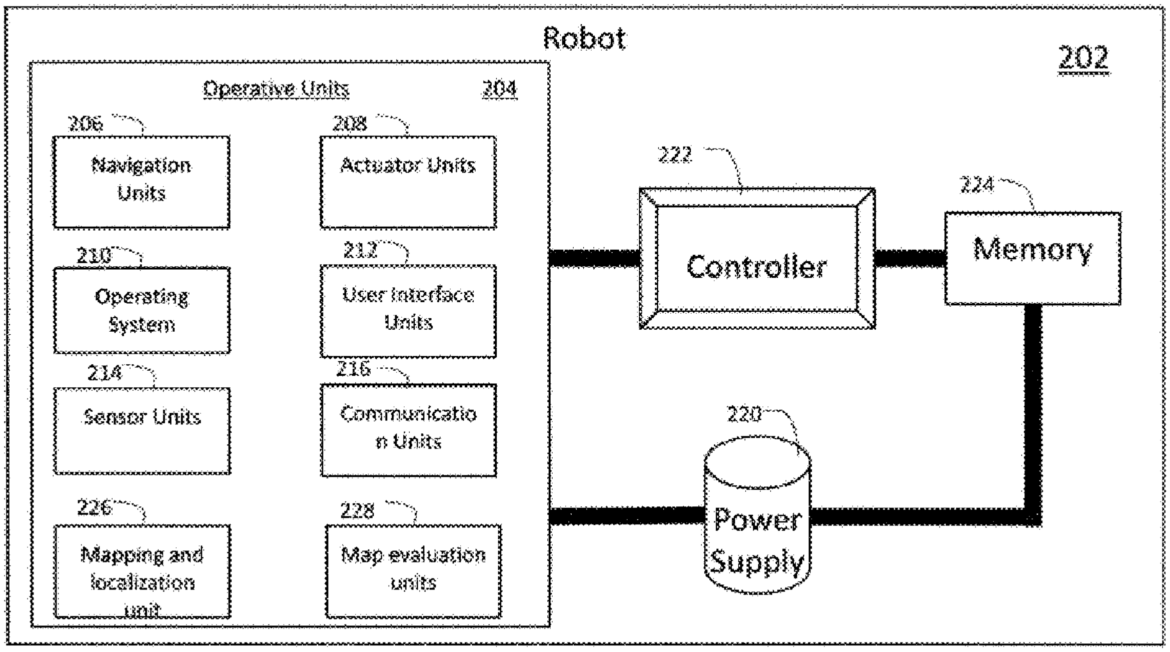
FIG. 2A is a functional block diagram of a robot in accordance with some implementations of this disclosure.

FIG. 2A is a functional block diagram of a robot 202 in accordance with an exemplary embodiment. As illustrated in FIG. 2A, robot 202 may include controller 222, memory 224, user interface unit 212, mapping and localization unit 218, sensor units 214, actuator unit 208, and communications unit 216, as well as other components and subcomponents (e.g., some of which may not be illustrated). Although a specific implementation is illustrated in FIG. 2A, it is appreciated that the architecture may be varied in certain implementations as would be readily apparent to one of ordinary skill given the contents of the present disclosure. As used herein, robot 202 may be representative at least in part of any robot described in this disclosure.

Controller 222 may control the various operations performed by robot 202. Controller 222 may include and/or comprise one or more processors (e.g., microprocessors) and other peripherals. As used herein, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs"), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 222 may be operatively and/or communicatively coupled to memory 224. Memory 224 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 224 may provide instructions and data to controller 222. For example, memory 224 may be a non-transitory, computer-readable storage apparatus and/or medium having a plurality of instructions stored thereon, the instructions being executable by a processing apparatus (e.g., controller 222) to operate robot 202. In some cases, the instructions may be configured to, when executed by the processing apparatus, cause the processing apparatus to perform the various methods, features, and/or functionality described in this disclosure. Accordingly, controller 222 may perform logical and/or arithmetic operations based on program instructions stored within memory 224. In some cases, the instructions and/or data of memory 224 may be stored in a combination of hardware, some located locally within robot 202, and some located remote from robot 202 (e.g., in a cloud, server, network, etc.).

It should be readily apparent to one of ordinary skill in the art that a processor may be external to robot 202 and be communicatively coupled to controller 222 of robot 202 utilizing communication units 216 wherein the external processor may receive data from robot 202, process the data, and transmit computer-readable instructions back to controller 222. In at least one non-limiting exemplary embodiment, the processor may be on a remote server (not shown).

In some exemplary embodiments, memory 224, as shown in FIG. 2A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensors unit 214 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 202 operates, the complexity of objects and/or people, the variability in appearance of objects, physical properties of robots, the characteristics of the sensors, and/or the amount of available storage space (e.g., in the library, memory 224, and/or local or remote storage). In exemplary embodiments, at least a portion of the library may be stored on a network (e.g., cloud, server, distributed network, etc.) and/or may not be stored completely within memory 214. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

In exemplary embodiments, power supply 226 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 226 may also be any supplier of energy, including wall sockets and electronic devices that convert solar, wind, water, nuclear, hydrogen, gasoline, natural gas, fossil fuels, mechanical energy, steam, and/or any power source into electricity Still referring to FIG. 2A, operative units 204 may be coupled to controller 222, or any other controller, to perform the various operations described in this disclosure. One, more, or none of the modules in operative units 204 may be included in some embodiments. Throughout this disclosure, reference may be to various controllers and/or processors. In some embodiments, a single controller (e.g., controller 222) may serve as the various controllers and/or processors described. In other embodiments different controllers and/or processors may be used, such as controllers and/or processors used particularly for one or more operative units 204. Controller 222 may send and/or receive signals, such as power signals, status signals, data signals, electrical signals, and/or any other desirable signals, including discrete and analog signals to operative units 204. Controller 222 may coordinate and/or manage operative units 204, and/or set timings (e.g., synchronously or asynchronously), turn off/on control power budgets, receive/send network instructions and/or updates, update firmware, send interrogatory signals, receive and/or send statuses, and/or perform any operations for running features of robot 202.

Returning to FIG. 2A, operative units 204 may include various units that perform functions for robot 202. For example, operative units 204 includes at least navigation units 206, actuator units 208, user interface units 212, sensor units 214, and communication units 216. Operative units 204 may also comprise other units that provide the various functionality of robot 202. In exemplary embodiments, operative units 204 may be instantiated in software, hardware, or both software and hardware. For example, in some cases, units of operative unit 204 may comprise computer implemented instructions executed by a controller. In exemplary embodiments, units of operative unit 204 may comprise hardcoded logic. In exemplary embodiments, units of operative units 204 may comprise both computer-implemented instructions executed by a controller and hardcoded logic. Where operative units 204 are implemented in part in software, operative units 204 may include units/modules of code configured to provide one or more functionalities.

In exemplary embodiments, navigation units 206 may include systems and methods that may computationally construct and update a map of an environment, localize robot 202 (e.g., find the position) on a map, and navigate robot 202 to/from destinations. The mapping may be performed by imposing data obtained in part by sensor units 214 into a computer-readable map representative at least in part of the environment. In exemplary embodiments, a map of an environment may be uploaded to robot 202 through user interface units 212, uploaded wirelessly or through wired connection, or taught to robot 202 by a user.

In exemplary embodiments, navigation units 206 may further comprise a mapping and localization unit 218 which may receive sensor data from sensors units 214 to localize robot 202 on a map. In exemplary embodiments, mapping and localization units may include localization systems and methods that allow robot 202 to localize itself on the coordinates of a map and/or relative to a location (e.g., an initialization location, end location, beacon, reference point, etc.). Mapping and localization units may also process measurements taken by robot 202, such as by generating a graph and/or map. In some embodiments, mapping and localization unit 218 may not be a separate unit, but rather a portion of sensors unit 214 and/or controller 222.

In some embodiments, navigation units 206 may further comprise a map evaluation unit 220, which may analyze and evaluate a map or route to detect errors (e.g., map errors, map resolution, discontinuous routes, etc.), and/or the usability of a map or route. In exemplary embodiments, navigation units 206 determine a map to be unusable and/or contain errors causing robot 202 to prompt a user to re-demonstrate a route, or otherwise re-map the environment.

In exemplary embodiments, navigation units 206 may include components and/or software configured to provide directional instructions for robot 202 to navigate. Navigation units 206 may process maps, routes, and localization information generated by mapping and localization units, data from sensor units 214, and/or other operative units 204.

In exemplary embodiments, robot 202 may map and learn routes through a learning process. For example, an operator may teach robot 202 where to travel in an environment by driving robot 202 along a route in an environment. Through a combination of sensor data from sensor units 214, robot 202 may determine robot 202's relative poses and the poses of items in the environment. In this way, robot 202 may determine where it is in an environment and where it has travelled. Robot 202 may later recall where it travelled and travel in a substantially similar way (though it may avoid certain obstacles in subsequent travels). In some embodiments, robots may share such experiences with each other wirelessly, utilizing communication units 216.

Still referring to FIG. 2A, actuator units 208 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 202 to navigate a route; navigate around obstacles; rotate cameras and sensors.

According to exemplary embodiments, sensor units 214 may comprise systems and/or methods that may detect characteristics within and/or around robot 202. Sensor units 214 may comprise a plurality and/or a combination of sensors. Sensor units 214 may include sensors that are internal to robot 202 or external, and/or have components that are partially internal and/or partially external. In some cases, sensor units 214 may include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to exemplary embodiments, sensor units 214 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 214 may generate data based at least in part on measurements. Such data may be stored in data structures, such as matrices, arrays, queues, lists, arrays, stacks, bags, etc. According to exemplary embodiments, the data structure of the sensor data may be called an image.

According to exemplary embodiments, sensor units 214 may include sensors that may measure internal characteristics of robot 202. For example, sensor units 214 may measure temperature, power levels, statuses, and/or any characteristic of robot 202. In some cases, sensor units 214 may be configured to determine the odometry of robot 202. For example, sensor units 214 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 202. This odometry may include position of robot 202 (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

Mapping and localization unit 218 may receive sensor data from sensor units 214 to localize robot 202 in a map. According to exemplary embodiments, mapping and localization unit 218 may include localization systems and methods that allow robot 202 to localize itself in the coordinates of a map and/or relative to a location (e.g., an initialization location, end location, beacon, reference point, etc.). Mapping and localization unit 218 may also process measurements taken by robot 202, such as by generating a graph and/or map. According to exemplary embodiments, mapping and localization unit 218 may not be a separate unit, but rather a portion of sensor units 214 and/or controller 222.

According to exemplary embodiments, robot 202 may map and learn routes through a learning process. For example, an operator may teach robot 202 where to travel in an environment by driving robot 202 along a route in an environment. Through a combination of sensor data from sensor units 214, robot 202 may determine robot 202's relative poses and the poses of items in the environment. In this way, robot 202 may determine where it is in an environment and where it has travelled. Robot 202 may later recall where it travelled and travel in a substantially similar way (though it may avoid certain obstacles in subsequent travels). Robots may share such experiences with each other, such as through a network.

According to exemplary embodiments, user interface unit 212 may be configured to enable a user to interact with robot 202. For example, user interface unit 212 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 212 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface unit 212 may be positioned on the body of robot 202. According to exemplary embodiments, user interface unit 212 may be positioned away from the body of robot 202 but may be communicatively coupled to robot 202 (e.g., via communication units including transmitters, receivers, and/or transceivers) directly or indirectly (e.g., through a network, server, and/or a cloud). According to exemplary embodiments, user interface unit 212 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 216 may include one or more receivers, transmitters, and/or transceivers. Communications unit 216 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communications unit 216 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 216 to communicate to external systems, such as computers, smart phones, tablets, data capture systems, mobile telecommunications networks, clouds, servers, or the like. Communications unit 216 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 216 may be configured to send and receive statuses, commands, and other data/information. For example, communications unit 216 may communicate with a user operator to allow the user to control robot 202. Communications unit 216 may communicate with a server/network (e.g., a network) in order to allow robot 202 to send data, statuses, commands, and other communications to the server. The server may also be communicatively coupled to computer(s) and/or device(s) that may be used to monitor and/or control robot 202 remotely. Communications unit 216 may also receive updates (e.g., firmware or data updates), data, statuses, commands, and other communications from a server for robot 202.

Actuator unit 208 may include any system used for actuating, in some cases to perform tasks. For example, actuator unit 208 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 208 may include systems that allow movement of robot 202, such as motorized propulsion. For example, motorized propulsion may move robot 202 in a forward or backward direction, and/or be used at least in part in turning robot 202 (e.g., left, right, and/or any other direction). By way of illustration, actuator unit 208 may control if robot 202 is moving or is stopped and/or allow robot 202 to navigate from one location to another location.

One or more of the units described with respect to FIG. 2A (including memory 224, controller 222, sensor units 214, user interface unit 212, actuator unit 208, communications unit 216, mapping and localization unit 218, and/or other units) may be integrated onto robot 202, such as in an integrated system. However, according to exemplary embodiments, one or more of these units may be part of an attachable module. This module may be attached to an existing apparatus to automate so that it behaves as a robot. Accordingly, the features described in this disclosure with reference to robot 202 may be instantiated in a module that may be attached to an existing apparatus and/or integrated onto robot 202 in an integrated system. Moreover, in some cases, a person having ordinary skill in the art would appreciate from the contents of this disclosure that at least a portion of the features described in this disclosure may also be run remotely, such as in a cloud, network, and/or server.

One skilled in the art would appreciate that controller 222 may be alternatively referred to as a processor; wherein, the controller or the processor may correspond to a server at a remote location that is configured to operate the robot 202 by transmitting wireless signals thereto upon execution of specialized algorithms disclosed herein.

As used here on out, a controller (e.g., controller 222) performing a task or function includes the controller executing instructions from a non-transitory computer readable memory unit (e.g., memory 224) communicatively coupled to the controller. Similarly, a robot performing a task includes a controller executing instructions from a non-transitory computer readable memory unit and sending signals to a plurality of operative units effectuating their control. Additionally, it is appreciated by one of ordinary skill in the art that a controller or processor and memory units may be external to a robot and communicatively coupled via wired or wireless communication channels.

Figure 2B:
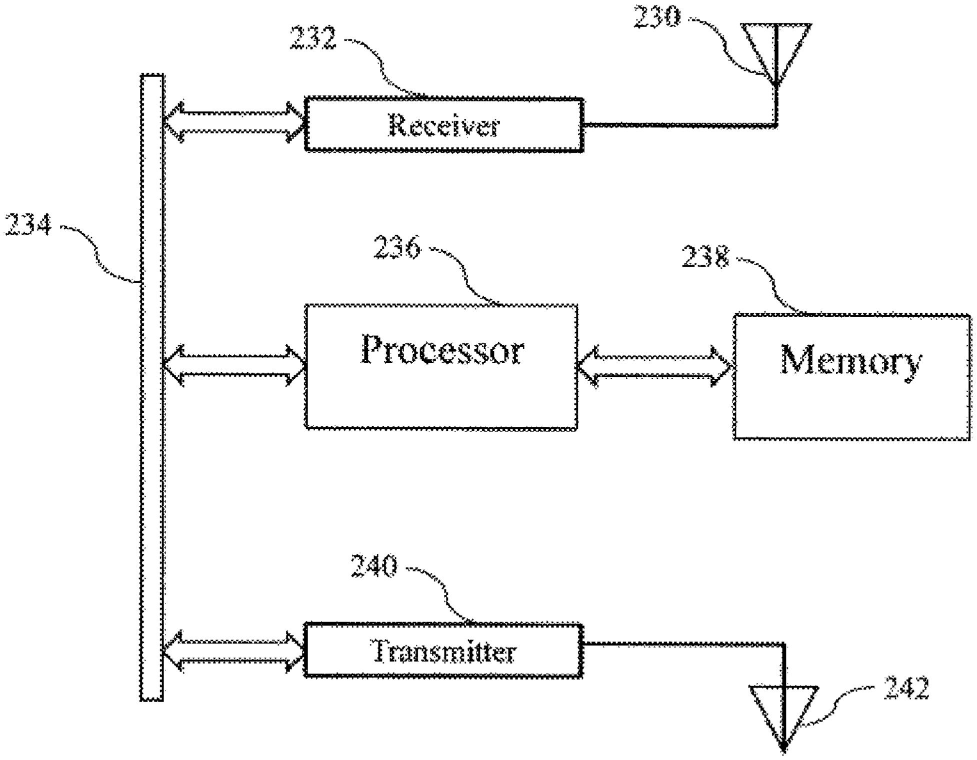
FIG. 2B is a functional block diagram of a controller illustrated in FIG. 2A according to an exemplary embodiment.

Next referring to FIG. 2B, the architecture of the specialized controller 222 used in the system shown in FIG. 2A is illustrated according to an exemplary embodiment. As illustrated in FIG. 2B, the specialized computer includes a data bus 234, a receiver 232, a transmitter 240, at least one processor 236, and a memory 238. The receiver 232, the processor 236 and the transmitter 240 all communicate with each other via the data bus 234. The processor 236 is a specialized processor configured to execute specialized algorithms as disclosed herein. The processor 236 is configured to access the memory 238, which stores computer code or instructions in order for the processor 236 to execute the specialized algorithms. As illustrated in FIG. 2B, memory 238 may comprise some, none, different, or all of the features of memory 224 previously illustrated in FIG. 2A. The algorithms executed by the processor 236 are discussed in further detail below. The receiver 232 as shown in FIG. 2B is configured to receive input signals 230 from at least navigation units 206, actuator units 208, user interface units 212, sensor units 214, communication units 216, mapping and localization units 218, and map evaluation units 220. The input signals 230 may comprise signals from a plurality of operative units 204 illustrated in FIG. 2A including, but not limited to, sensor data from sensor units 114, user inputs, motor feedback, external communication signals (e.g., from a remote server), and/or any other signal from an operative unit 204 requiring further processing by the specialized controller 222. The receiver 232 communicates these received signals to the processor 236 via the data bus 234. As one skilled in the art would appreciate, the data bus 234 is the means of communication between the different components—receiver, processor, and transmitter—in the specialized controller 222. The processor 236 executes the algorithms, as discussed below, by accessing specialized computer-readable instructions from the memory 238. Further detailed description as to the processor 236 executing the specialized algorithms in receiving, processing and transmitting of these signals is discussed above with respect to FIG. 2A. Thereafter, output signals 242 are transmitted via transmitter 240 based on the execution of the specialized algorithm by the processor 236. The output signals 242 are transmitted to at least navigation units 206, actuator units 208, user interface units 212, sensor units 214, communication units 216, mapping and localization units 218, and map evaluation units 220.

The memory 238 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 236 may communicate output signals to transmitter 240 via data bus 234 as illustrated. The transmitter 240 may be configured to further communicate the output signals to a plurality of operative units 204 illustrated by signal output 242.

One of ordinary skill in the art would appreciate that the architecture illustrated in FIG. 2B may alternatively illustrate a server configured to effectuate the control of a robotic apparatus from a remote or distant location. That is, the server may also include a data bus, a receiver, a transmitter, a processor, and a memory that stores specialized computer readable instructions thereon, such that the execution of the specialized algorithm as discussed above under FIGS. 2A and 2B is executed by a remote server that may or may not be in the same physical location as robot 202.

Figure 3A:
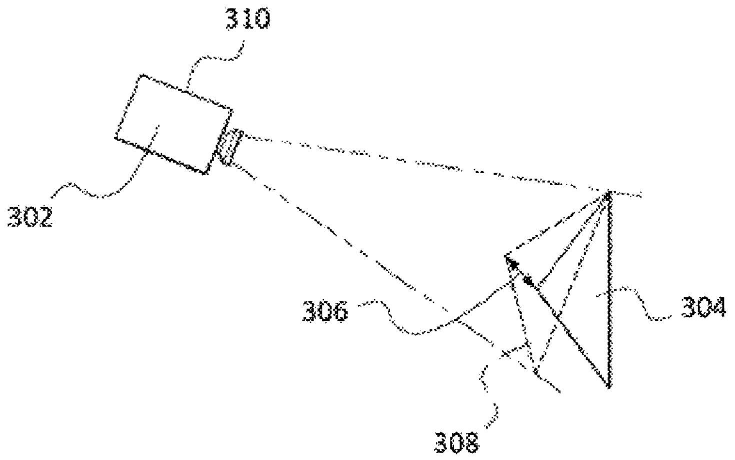
FIG. 3A is an illustration of a sensor perceiving a reference point in the calibration environment as shown in FIG. 1 according to an exemplary embodiment.

FIG. 3A is an illustration of a sensor 302, of sensor units 214 illustrated in FIG. 2A, collecting measurements of a target 304, according to an exemplary embodiment. The sensor 302 is positioned at location 310. The sensor 302 may be, for example, the front depth camera 124, planar LIDAR 126, slanted LIDAR 122, and rear depth cameras 128 (left and right) illustrated in FIG. 1D above that receive data of the perceived position of a sensor target 304. The sensor target 304 may be, for example, any of sensor targets 102, 104, 106, 108, 110, and/or 112 shown in FIG. 1A-E or other sensor target type. The data collected by the planar LIDAR 126 may comprise pose data of the sensor target 304 and may be represented as, for example, as $X_1'$, $Y_1'$, $Z_1'$, $Yaw_1'$, $Pitch_1'$ and $Roll_1'$ as shown in table 400 of FIG. 4; and for slanted LIDAR 122 the data received may be represented as, for example, $X_2'$, $Y_2'$, $Z_2'$, $Yaw_2'$, $Pitch_2'$ and $Roll_2'$, as shown in FIG. 4, so on and so forth. The sensor 302 may localize the target 304 (i.e., measure (x, y, z, yaw, pitch, roll), size of the target 304, and distance between sensor 302 and the target 304) and a controller 222 may store the measured data of the target 304 in memory. Upon comparing the sensor data received from the sensor 304 with an ideal CAD model, comprising ideal localization data of the target 304 as shown in block 512 of FIG. 5, further discussed below, the specialized controller 222 may determine that there is offset from the location of sensor target 304 by an error 306, as shown in block 512 in FIG. 5.

In at least one non-limiting exemplary embodiment, error 306 may comprise data gathered by sensor units 214 further comprising differences in position, pitch, roll, and/or yaw of sensor target 304 stored in memory 224 by controller 222. According to at least one non-limiting exemplary embodiment, controller 222 processes error 306 and location of the sensor target 304 in an ideal CAD to generate a transformation matrix to be applied to a sensor data matrix to calibrate the sensor. In another non-limiting exemplary embodiment, sensor target 304 may comprise, but not be limited to, any type of sensor targets 102, 104, 106, 108, 110, or 112 illustrated in FIG. 1A.

Figure 3B:
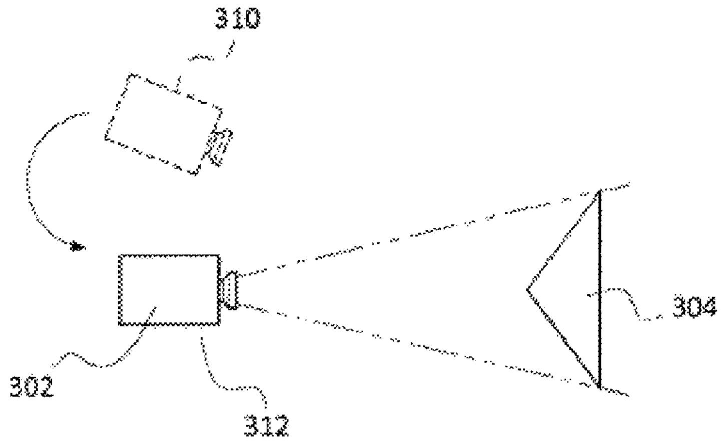
FIG. 3B is another illustration of the sensor shown in FIG. 3A perceiving the reference point shown in FIG. 1 with corrected position according to an exemplary embodiment.

Next referring to FIG. 3B, a transformation matrix applied to sensor 302 by the controller 222, according to an exemplary embodiment. That is, position of the sensor 302 is changed from a first location 310 to a different location 312 in order to correct the error 306 shown in FIG. 3A. The correcting of the error 306 by the controller 222 causes the sensor 302 to perceive target 304 in its correct position. Position 312 of the sensor 302 is calculated by controller 222 by executing instructions stored in memory 224 which will compare the sensor data to the ideal CAD model of the environment (e.g., 3D scan matching if the sensor 302 is a LIDAR or depth camera). In turn, as discussed in further detail below, the sensor data location shown in FIG. 4, which is data obtained by the respective sensor, is compared by the CAD model and upon finding discrepancy or error between the two, the sensor data location is matched to the CAD model.

In at least one non-limiting exemplary embodiment, controller 222 may execute instructions stored in memory 224 to virtually adjust sensor location 310 by applying a transformation matrix, comprising transformations to sensor data, calculated based on error 306 by controller 222, to adjust the perception of objects by the sensor to align with the ideal CAD model. In another non-limiting exemplary embodiment, this transformation may comprise transformations to coordinate positions, pitch, yaw, and/or roll of data of the respective sensor (i.e., front depth camera 124, slanted LIDAR 122, planar LIDAR 126, and rear depth cameras 128) to align the perceived position of sensor target 306 with the ideal CAD model location 308. In another non-limiting exemplary embodiment, positions 310 and 312 may occupy the same physical space, wherein change in position 310 to 312 may be representative of a virtual adjustment of sensor 302.

Figure 10:
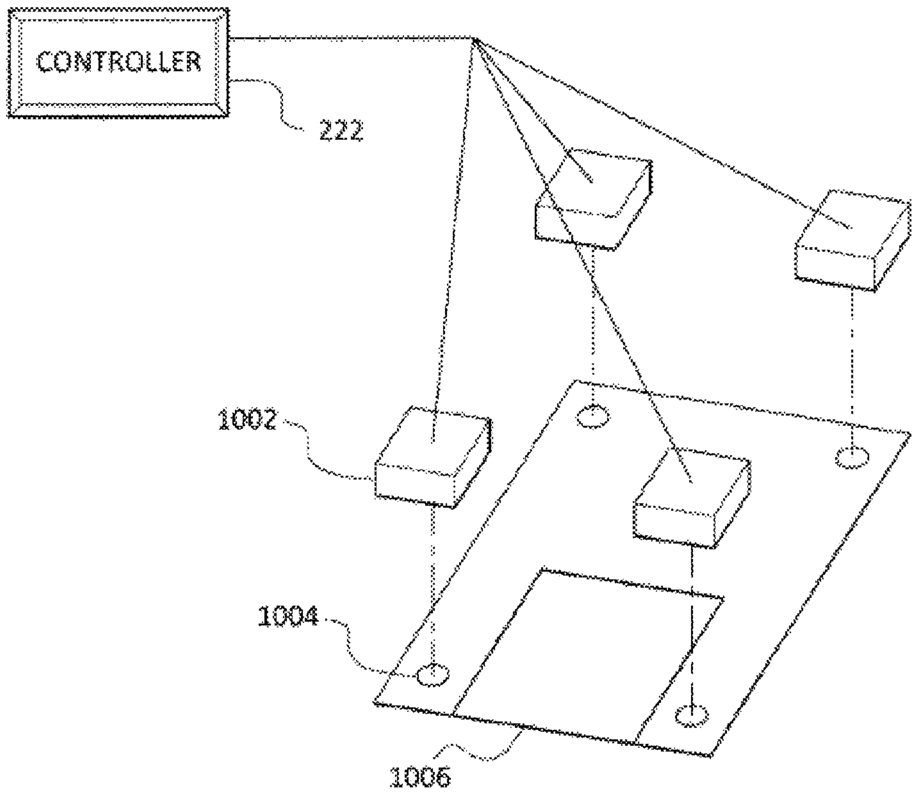
FIG. 10 illustrates an apparatus used to adjust a sensor based on a calibration measurement according to an exemplary embodiment.

In another non-limiting exemplary embodiment, controller 222 may execute instructions stored in memory 224 causing one or more actuator units 208 to adjust sensor unit 302 to a different position 312 shown in FIG. 3B. This adjustment may comprise rotation, lateral, horizontal, and/or vertical adjustment of the respective sensor 302, as illustrated in FIG. 10 below.

In another non-limiting exemplary embodiment, controller 222 may execute instructions stored in memory 224 causing a user interface unit 212 to display instructions to an operator comprising instructions for manual adjustment of a sensor if no virtual transformation or actuator may reduce error 306.

Next referring to FIG. 4 an example of a data table 400 is illustrated according to an exemplary embodiment. Data entries of table 400 may comprise measured pose data of sensor targets by respective sensor units 214 with respect to an origin (e.g., an origin may be any predetermined point on the robot or within the environment 100). The sensor units 214 may include, for example, as illustrated in FIG. 1, a planar LIDAR 126, a slanted LIDAR 122, a front depth camera 124, right depth camera 128-R, and left depth camera 128-L of a robot 202 positioned within the calibration environment 100. One skilled in the art would appreciate that additional or fewer sensors may be included on a robot 202, wherein the sensors illustrated are not intended to be limiting. Each sensor unit 214 may be activated to measure pose data of one or more sensor targets within their respective fields of view. The measured pose data of the sensor targets may be compared to an ideal pose of the sensor targets to determine a discrepancy (e.g., error 306 of FIG. 3A above), the ideal pose being denoted in the ideal CAD model of the calibration environment 100 based on known poses of the targets (e.g., measured by an operator).

A controller 222 of the robot 202 or separate processor may execute computer readable instructions to determine an error (e.g., 306) based on a comparison of pose coordinates between the measured data ($x_n'$, $y_n'$, $z_n'$, $yaw_n'$, $pitch_n'$, $roll_n'$) and known or ideal pose data ($x_n$, $y_n$, $z_n$, $yaw_n$, $pitch_n$, $roll_n$) of the respective target from the ideal CAD model for each sensor. Wherein, 'n' being an integer number corresponding to any sensor of sensor units 214. Based on the comparison, a real pose of each respective sensor may be determined, the real pose corresponding to a pose of the respective sensor on the robot 202 during the measurements of the sensor targets. Using the real poses, the controller 222 or separate processor may determine at least one of: (i) a digital transformation to be applied to data from respective sensor units to configure the transformed data to match the ideal pose data, or (ii) a physical adjustment to a pose of the respective sensor units using an actuator or manual adjustment by an operator. The digital transformation or physical adjustment configures the respective sensor to output data of the respective sensor target, which matches the ideal CAD model.

One skilled in the art would appreciate that data table 400 shown in FIG. 4 is a self-referential table, wherein a specific column and row may be able to reference a separate column and row, as controller 222 executes computer readable instructions to add additional columns and rows. As a preliminary step, the data table 400 may only consist of the rows and columns that include the respective sensors illustrated in FIG. 4 and the respective CAD model inputs (e.g., poses of sensor targets 102, 104, 106, 108, 110, and 112). For example, data table 400 would be limited to data in a 5×6 matrix which includes five (5) rows consisting of front depth camera 124, slanted LIDAR 122, planar LIDAR 126, right depth camera 128-R, and left depth camera 128-L, and six (6) columns consisting of x-axis, y-axis, z-axis, pitch angle, roll angle and the yaw angle, based on the ideal pose or CAD model. Thereafter, upon introducing the robot 202 to the calibration room or environment 100 shown in FIG. 1, and turning on the respective sensors, the data received by the respective sensors may expand or extrapolate the data table 400 to six (6) additional columns, which include the data obtained from the respective sensors; and potentially more rows for addition of any additional sensors to the robot 202. For example, for the $n^{th}$ sensor, a $n^{th}$ data row may be added to the data table 400. Accordingly, one skilled in the art that the data table 400 stored in memory 224, for example, may be modified or extrapolated, by addition of rows and columns, based on the data collected by the respective sensors.

According to at least one non-limiting exemplary embodiment, data entries of table 400 may similarly represent poses of the respective sensor units 214 rather than poses of the respective sensor targets. The poses of the sensor units 214 may be determined based on, measuring poses of the sensor targets, comparing the measured poses of the targets with the known poses of the targets from an ideal CAD model to determine an error 306, and utilizing the error 306 to determine a pose of the sensor with respect to a default pose, the default pose being known (e.g., from a manufacturer of a robot). In other words, if the sensor pose was at the default pose to begin with, the measured pose of the sensor target would be the same as the pose provided by the ideal CAD model. The determined pose for each respective sensor unit 214 may be compared to a known default pose for each respective sensor unit 214 such that an error 306 may be determined by a controller 222 of a robot 202 executing computer readable instructions from memory 224. The error 306 may configure the controller 222 to either apply a digital transform or physical adjustment to the sensor.

According to at least one non-limiting exemplary embodiment, the data entries of the table 400 may comprise matrices, or other data structures, corresponding to a pose of either the sensor units or respective sensor targets. For example, LiDAR and depth camera sensors may provide a three dimensional point cloud matrix, which may be compared to an ideal CAD point cloud, using an iterative closest point algorithm, to determine a transformation corresponding to an error in a pose of the sensor. Similarly, as another example, data entries may comprise tensors of pixel color values of images captured by an RGB camera sensor, wherein the pixel color values and positions within the images may be compared to ideal images (e.g., captured by a RGB camera in a default pose). That is, comparing poses of the sensor target/sensor is not intended to be limiting as other reference data structures (analogous to the ideal CAD model described herein) may be utilized to calibrate the sensor, the reference data structures comprising values representative of sensor targets within the calibration environment 100.

According to at least one non-limiting exemplary embodiment, the data of table 400 may comprise of some, none, more, or all the data types in table 400 (e.g., color of target, size of target, etc.). In at least one non-limiting exemplary embodiment, sensor units 214 may comprise of some, none, different, and/or additional types of sensor units illustrated in table 400.

According to another non-limiting exemplary embodiment, one sensor may collect data from a plurality of targets wherein controller 222 stores additional data in memory 224 comprising the perceived and ideal CAD locations of the sensor targets. Similarly, in another non-limiting exemplary embodiment, a plurality of sensors may collect data from one sensor target wherein controller 222 stores additional data in memory 224 comprising the additional perceived and ideal CAD location of the sensor target.

Figure 5:
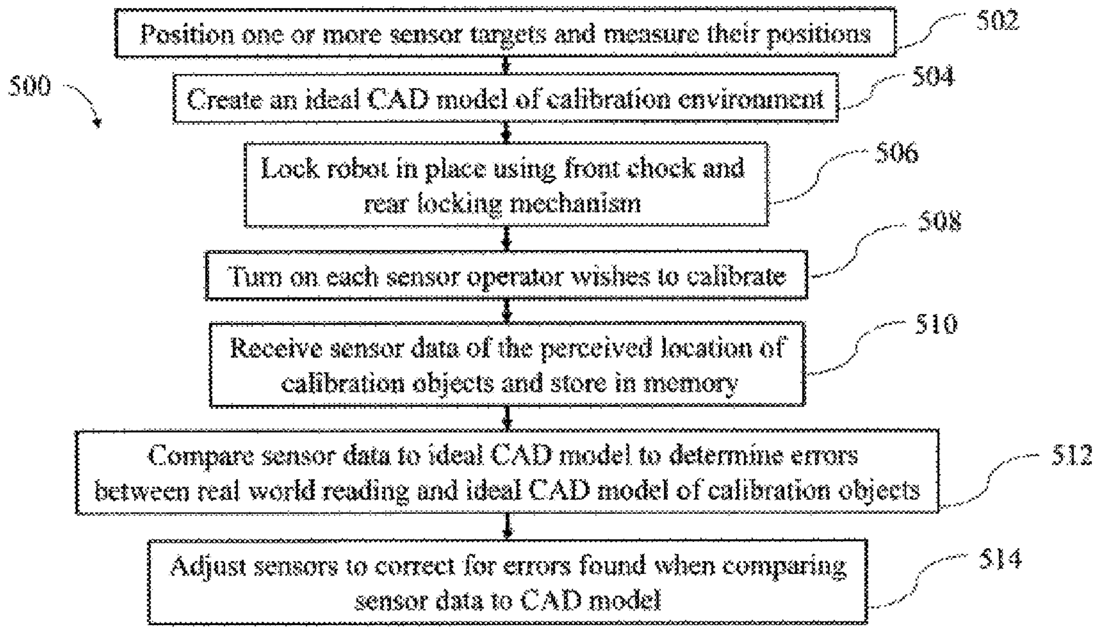
FIG. 5 is a process flow diagram of a method for operating a calibration room to calibrate a robot by a specialized processor according to an exemplary embodiment.

FIG. 5 is a process flow diagram, with reference to FIGS. 1A-E and 2A, of process 500 for an operator desiring to calibrate at least one sensor of sensor units 214 on a robot 202 utilizing the systems and methods of the present disclosure according to an exemplary embodiment. Block 502 illustrates an operator positioning one or more sensor targets 102, 104, 106, 108, 110, and/or 112 at fixed locations as shown in FIG. 1 and measuring their position within the calibration environment.

Block 504 illustrates an operator, using the measurements found in block 502, to create an ideal CAD model of the calibration environment 100, previously illustrated in FIGS. 1A-E. According to at least one non-limiting exemplary embodiment, the ideal CAD model of the calibration environment 100 may be created by a separate specialized processing apparatus for later processing by robot 202. The ideal CAD model may comprise a data structure or set of values corresponding to ideal measurements by sensors of a robot 202 of the sensor targets with the sensors being at respective default (i.e., perfectly calibrated) poses.

Block 506 illustrates robot 202 being locked into position 116 by utilizing front wheel chock 120, rear wheel chocks 118, and/or rear latching device 114, as shown in FIGS. 1A and 1D, to ensure robot 202 is in a fixed location and to ensure position 116 stays fixed for additional robots to be calibrated using the same environment according to an exemplary embodiment. Any mechanism may be utilized to secure robot 202 in a fixed, known location within the calibration environment 100, wherein use of a front and rear wheel chocks are not intended to be limiting.

Block 508 illustrates an operator utilizing user interface units 212, shown in FIG. 2A, to send a signal to controller 222. The controller 222 upon receipt of the signal will execute instructions stored in the memory 224 to gather data from sensor units 214 of the surrounding environment 100 and thereafter store the data in memory 224. According to at least one non-limiting exemplary embodiment, controller 222 may gather data from one, some, or all sensors specified by an operator through user interface units 212.

Block 510 illustrates sensor units 214 receiving data from the location and orientation of sensor targets 102, 104, 106, 108, 110, and/or 112. According to at least one non-limiting exemplary embodiment, this sensor data may comprise any one or more of lateral orientation, horizontal orientation, vertical orientation, pitch, yaw, and/or roll and may be stored in a matrix within memory 224.

Block 512 illustrates controller 222 executing instructions from memory 224 to compare gathered sensor data to the idealized CAD model of the environment 100 and determining errors. According to at least one non-limiting exemplary embodiment, these errors are stored in memory for later adjustment of sensor units 214 and may comprise differences between sensor data and ideal CAD model including, but not limited to, lateral orientation, horizontal orientation, vertical orientation, pitch, yaw, and/or roll of a sensor target. According to another non-limiting exemplary embodiment, a transformation matrix corresponding to a difference between a measured pose and an ideal pose of each sensor target may be stored in memory. For example, with reference to FIG. 3A-B, the transformation matrix may comprise a spatial transformation between location 310 and location 312 based on error 306. That is, any value representing a difference between the measured pose of the sensor targets and the ideal pose of the sensor targets denoted by the ideal CAD model may be stored in memory, wherein the value may be zero or nonzero.

Block 514 illustrates controller 222 executing instructions from memory 224 that, when executed, causes controller 222 to adjust sensors to minimize errors. According to at least one non-limiting exemplary embodiment, these sensors (e.g., front depth camera 124, slanted LIDAR 122, and rear depth cameras 128, etc.) may be adjusted by controller 222 executing code from memory 224 that may cause actuator units 208 to adjust the positioning of sensors, as illustrated in FIG. 10 below. According to another non-limiting exemplary embodiment, controller 222 executing instructions from memory 224 may create a transformation matrix based, at least in part, on error data found in block 510 and applying the transformation matrix to sensor data causing sensor units 214 to perceive the object correctly. According to another non-limiting exemplary embodiment, controller 222 may send a signal to a user interface, of user interface units 212, causing the user interface to display instructions for manual adjustment of a sensor based on the calculated errors.

Figure 6A:
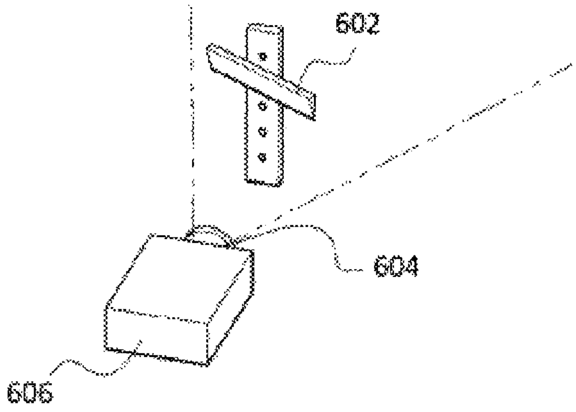
FIGS. 6A and 6B are illustrative examples of sensor targets being adjusted to meet the needs of different sensors and robots according to an exemplary embodiment.

FIG. 6A is an illustrative embodiment of the method of calibrating sensor 604 on robot 606 according to an exemplary embodiment. In referencing sensor 604, one skilled in the art would appreciate that such a sensor may be a front depth camera 124, slanted LIDAR 122, planar LIDAR 126, rear depth cameras 128, or any other similar sensor to be calibrated using methods of the present disclosure. Sensor 604, as shown in FIG. 6A, collects data from sensor target 602 for calibration of sensor 604 utilizing the systems and methods of the present disclosure. In referencing sensor target 602, one skilled in the art would appreciate that such sensor target 602 may correspond to targets 102, 104, 106, 108, 110, or 112 illustrated in FIG. 1. Sensor target 602 is positioned such that it may be seen by sensor 604. In at least one non-limiting exemplary embodiment, sensor target 602 may comprise any type of sensor targets 102, 104, 106, 108, 110, 112 illustrated in FIG. 1 or any other sensor target comprising material visible to sensor 604.

The sensor 604 may collect measurements of the target 602 which may be compared to ideal measurements of a CAD model of the target 602. For example, edges of the target 602 may be localized by the sensor 604, wherein the localization of the edges may be compared to an ideal CAD model of the target 602 such that an error (e.g., error 306) may be determined. The error may correspond to a discrepancy in a pose of the sensor 604 from a default pose.

Figure 6B:
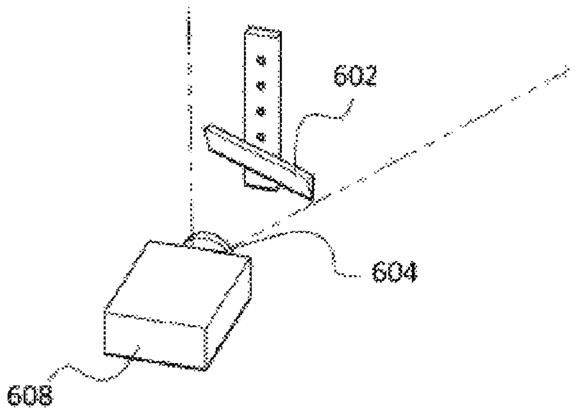

FIG. 6B is an illustrative embodiment of a method for calibrating sensor 604 on robot 608 according to an exemplary embodiment. Robot 606 may have different properties from robot 608 such as, but not limited to, size, location of sensor, number of sensors 604, etc. In at least one non-limiting exemplary embodiment, an operator may move sensor target 602 to allow for robot 608 to utilize sensor target 602 for calibration.

In another non-limiting exemplary embodiment, sensor target 602 may be positioned using screws, latches, Velcro®, magnets, a sliding mechanism, or any similar method to facilitate repositioning of sensor target 602 so that different robots 606 and 608 may be calibrated in the same room by repositioning sensor target 602. In another non-limiting exemplary embodiment, sensor target 602 may encompass one or multiple sensor targets and similarly sensor 604 may encompass one or many sensors of sensor units 214 illustrated in FIG. 2A. Additionally, after robot 606's sensor 604 has been calibrated, sensor target 602 may be exchanged for a different sensor target to facilitate the calibration of robot 608 if sensor target 602 cannot be used to calibrate sensor 604 of robot 608.

Figure 7A:
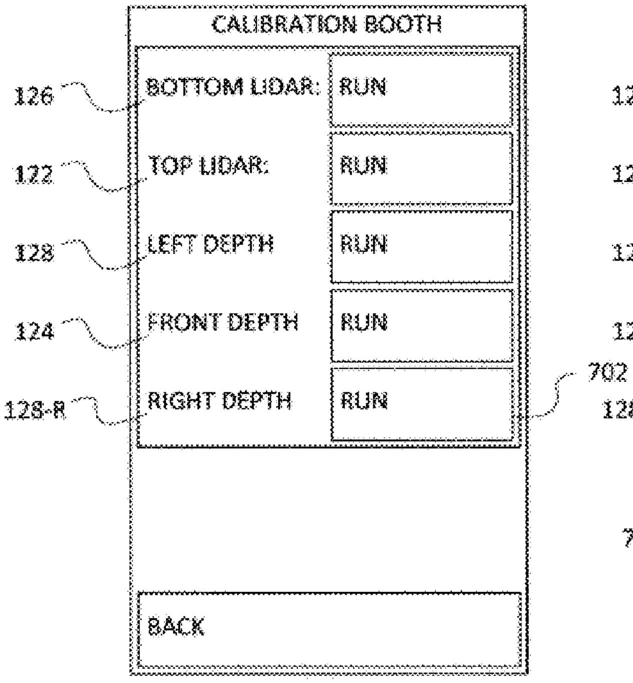
FIGS. 7A-C are illustrative examples of user interfaces displayed on a device according to an exemplary embodiment.

FIG. 7A is an illustration of a user interface on a device, of user interface units 212, according to an exemplary embodiment. According to at least one non-limiting exemplary embodiment, the user interface of FIG. 7A provides a user a system to run calibration tests on each individual sensor and/or a plurality of sensors 122, 124, 126, 128, as shown in FIG. 1B, either independently or concurrently, as well as additional sensors (not shown) simultaneously. That is, either a single sensor may be calibrated at a time or a plurality of sensors may be calibrated all at once at the same time. As shown in FIG. 7A, a table format is illustrated with the respective sensor listed in the left column and the status of the respective sensor listed in the right column. The status "Run" 702 listed in the right column indicates that the right depth camera 128-R (i.e., labeled as right depth); front depth camera 124 (i.e., labeled as front depth), slanted LIDAR 122

(i.e., labeled as top LIDAR) and planar LIDAR 126 (i.e., labeled as bottom LIDAR) are in the ready state to be calibrated.

Figure 7B:
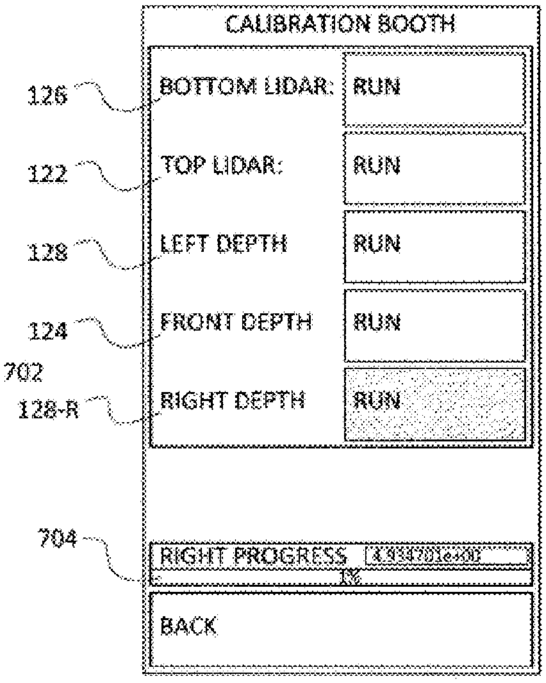

FIG. 7B is an exemplary illustration of a user interface while controller 222, shown in FIG. 2A, is running calibration tests on a right depth sensor 128-R of sensor units 214 according to an exemplary embodiment. That is, only the right depth sensor 128-R is being calibrated in this non-limiting exemplary embodiment. This is evidenced by the annotation "Right Progress" 704 in FIG. 7B which is not shown in FIG. 7A.

According to at least some non-limiting exemplary embodiment, the user interface may comprise additional, fewer, or the same number of sensors which may comprise the same and/or different types of sensors as illustrated in FIGS. 7A and 7B.

Figure 7C:
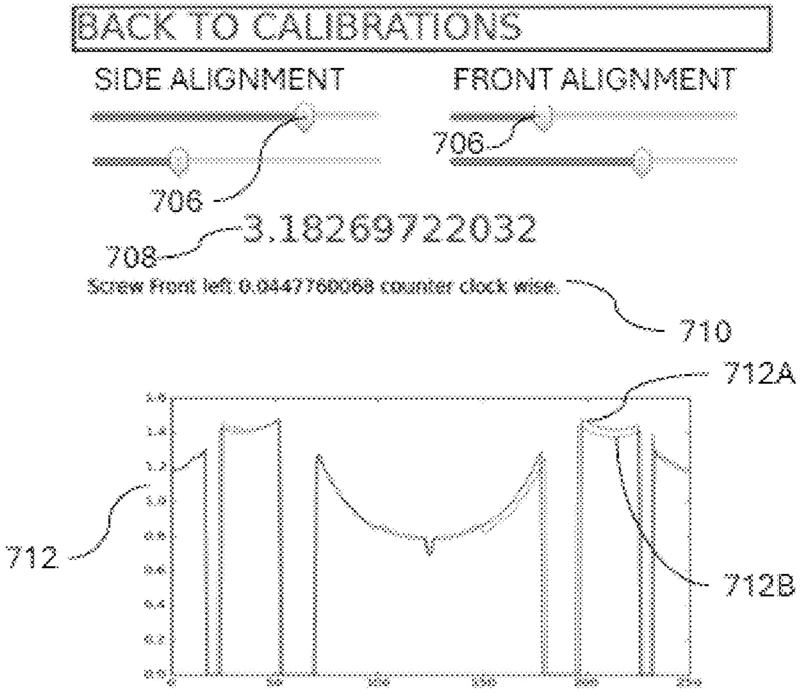

FIG. 7C is an exemplary illustration of a user interface, of user interface units 212, displaying calibration results from a sensor according to at least one exemplary embodiment. These results may comprise, but are not limited to, alignment visual indicators 706, a calibration score 708, operator instructions 710, and graphical sensor data 712. Visual alignment indicators 706 as illustrated provide an operator with a visual representation of the calibration results regarding the side and front alignment of the sensor. Calibration score 708 may be a representative numerical figure indicative of the accuracy of the sensor, wherein a low score may correspond to a well calibrated sensor and vice versa. The user interface may additionally display operator instructions 710 comprising further instructions for the operator to manually adjust the sensor based on calibration test results. Graphical sensor data 712, according to an exemplary embodiment, may further comprise a sensor reading 712A and CAD ideal reference reading 712B wherein an ideal reading would comprise graphs 712A and 712B to be indistinguishable. According to at least one non-limiting exemplary embodiment, controller 222 may determine, based on the calibration measurement, an adjustment to be made to the mounting of a sensor, further illustrated below in FIG. 10. According to at least one non-limiting exemplary embodiment, the user interface displaying calibration results may comprise some, none, or all of the results illustrated in FIG. 7C and may be displayed in a plurality of formats, not illustrated in FIG. 8, as would be appreciated by one of ordinary skill in the art.

Figure 8:
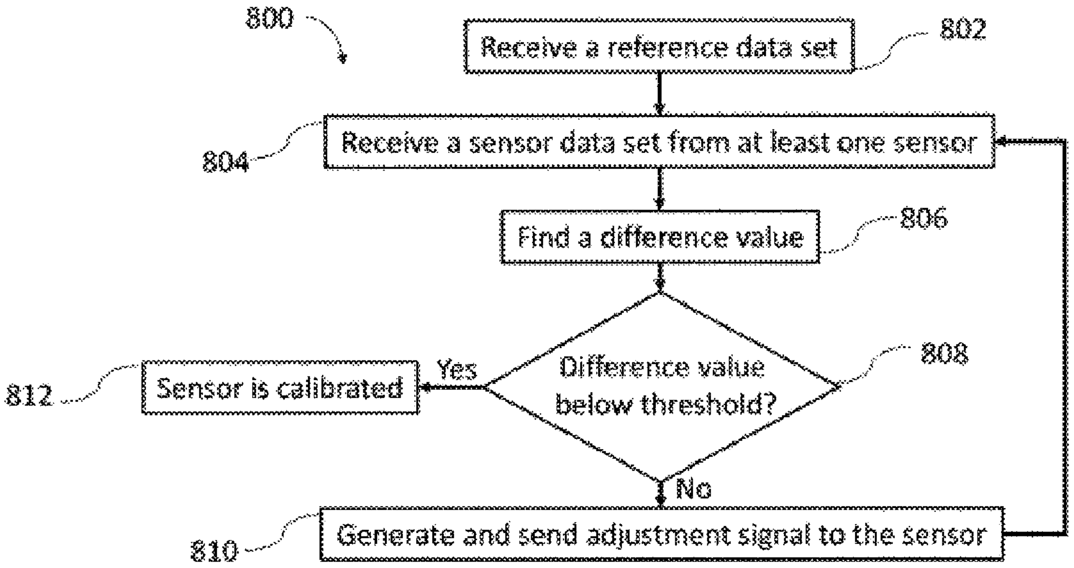
FIG. 8 is a process flow diagram of an exemplary method for a processor calibrating a sensor based on sensor data of the calibration environment according to an exemplary embodiment.

FIG. 8 is a process flow diagram illustrating a specialized controller 222, executing instructions stored in memory 224 with reference to FIG. 2A, calibrating and adjusting a sensor according to an exemplary embodiment. The sensor may comprise any sensor of sensor units 212 including, but not limited to, front depth camera 124, slanted LIDAR 122, planar LIDAR 126, or rear depth cameras 128. The sensor may be a sensor on a robot 202 positioned within a calibration environment 100.

Block 802 includes controller 222 receiving a set of reference data comprising an ideal sensor reading generated from a CAD model of the calibration environment 100. According to at least one non-limiting exemplary embodiment, the reference data may be received, via wired or wireless communication, from an external processor that generated the CAD model and reference data. According to another exemplary embodiment, the reference data may be calculated by controller 222 executing instructions stored in memory 224 without the use of an external processor. The reference data may be stored in memory 224 by controller 222 for later determination of a difference value in block 806.

Block 804 includes controller 222 receiving a set of sensor data from a calibration test and storing the data set in memory 224, as illustrated in FIG. 2A. The sensor data may comprise the data from a sensor of sensor units 214 and further comprise data representative of the detection of a sensor target at a corresponding orientation and position. The sensor data may be stored in memory 224 by controller 222 for later determination of the difference value in block 806. The calibration test may comprise the operator activating the sensor to measure at least one target.

Block 806 includes controller 222, executing instructions stored in memory 224 illustrated in FIG. 2A, calculating a difference value between the reference and sensor data sets. According to at least one non-limiting exemplary embodiment, the difference value may comprise one or many values such as, but not limited to, differences in positional coordinates (x, y, z), pitch, yaw, and/or roll. This difference value may be stored in memory 224 by controller 222 for later comparison to a threshold value illustrated in block 808.

Block 808 includes controller 222, executing instructions stored in memory 224 with reference to FIG. 2A, comparing the difference value found in block 806 to a set threshold, wherein a difference value below the set threshold corresponds to a calibrated sensor. The threshold may be set by an operator based on how accurately the operator desires to calibrate the sensors (e.g., lower threshold corresponds to more accurate calibration) and may further comprise thresholds for specific parameters (e.g., pitch, yaw, roll, and position parameters). For example, the threshold value may be zero, wherein a difference value of zero corresponds to no differences between the reference data set received in block 802 and the sensor data set received in block 804. Similarly, the threshold for individual parameters may differ from each other wherein, according to a non-limiting exemplary embodiment, the threshold for an accurate calibration for the pitch of a sensor target might be higher than the corresponding threshold for position in the case of calibrating a depth sensor. If the difference value is below the set threshold, controller 222 moves to block 812, whereas if the difference value is greater than zero (exceeding the threshold) controller 222 moves to block 810.

Block 810 includes controller 222, executing instructions stored in memory 224, generating and sending an adjustment signal to the sensor, the signal comprising adjustments to the sensor to minimize the difference value based, at least in part, on the difference value found in block 806. According to at least one non-limiting exemplary embodiment, the adjustment signal may comprise computer-readable instructions to virtually adjust the sensor by applying transformations to the sensor data. According to another non-limiting exemplary embodiment, this adjustment signal may comprise changes to the mounting of a sensor by activating an actuator, further illustrated below in FIG. 10. According to another non-limiting exemplary embodiment, the adjustment signal may be sent to a user interface and the signal may cause the user interface to display a set of instructions for manual adjustment of a sensor by the operator. According to at least one exemplary embodiment, the sensor may be calibrated a plurality of times after an adjustment signal is determined until the sensor reaches the operator's desired level of calibration (e.g., difference value falls below the threshold).

Block 812 includes a difference value, found in block 808, determined to be below the set threshold corresponding to a calibrated sensor and requiring no further action. It may be appreciated by one of ordinary skill in the art that the exemplary methods illustrated in FIG. 8 may be repeated to calibrate a plurality of sensors on a robot using substantially similar methods.

Figure 9A:
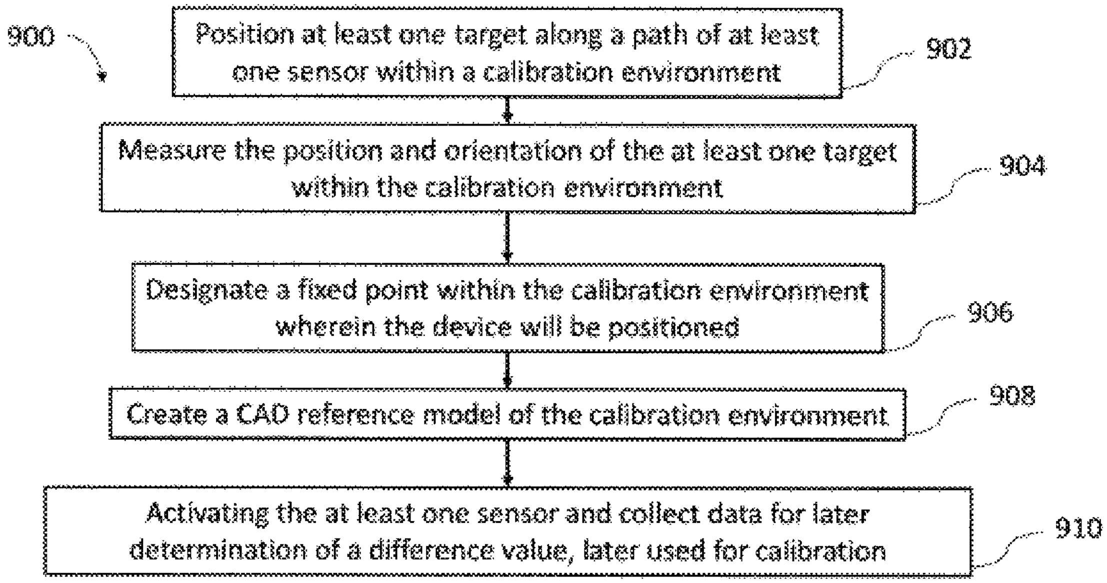
FIG. 9A is a process flow diagram of an exemplary method for an operator to operate a calibration environment.

FIG. 9A is a process flow diagram illustrating an exemplary method 900 for an operator, creating and operating a calibration environment 100, to calibrate at least one sensor on a device according to an exemplary embodiment. The sensor may comprise any sensor of sensor units 212 including, but not limited to, front depth camera 124, slanted LIDAR 122, planar LIDAR 126, or rear depth cameras 128.

Block 902 illustrates an operator positioning at least one sensor target within the path of at least one corresponding sensor. The sensor targets may comprise any sensor targets 102, 104, 106, 108, 110, and/or 112 illustrated in FIGS. 1A-D and may be positioned anywhere in the calibration environment within the path of a corresponding sensor. The sensor targets may be held in position by screws, latches, Velcro®, hooks, magnets, and/or any other similar type of mounting a sensor target. Block 904 illustrates the operator measuring the position and orientation of at least one sensor target within the calibration environment 100. These measurements may comprise any measurements useful in generating a CAD model of the calibration environment, later illustrated in block 908, such as at least one target's distance to the device, rotation relative to a fixed plane of reference, etc. According to another non-limiting exemplary embodiment, physical parameters of the target may additionally be measured by the operator such as, but not limited to, reflectiveness, color, shape, and/or any other physical parameter of a sensor target detectable by at least one sensor for later determination of a difference value, illustrated in FIG. 8. In some embodiments, an operator may position a sensor at a default pose (i.e., a well calibrated, ideal pose) and simply activate the sensor to measure parameters of the sensor target.

Block 906 illustrates an operator designating a fixed position within the calibration environment 100 where the device will be positioned during calibration. As illustrated in FIG. 1D, the designated fixed position may be fixed position 116 comprising rear wheel chock 118, front wheel chock 120 and a rear locking mechanism 114 to ensure the robot does not move during calibration. Additionally, as would be appreciated by one of ordinary skill in the art, the designation of a fixed point allows the operator to calibrate a plurality of identical devices accurately using a calibration environment 100 which, from the perspective of the plurality of identical robots 102 for example, is identical from device to device.

Block 908 illustrates the operator creating a CAD reference model of the calibration environment 100 using the measurements obtained in block 904 and the fixed point determined in block 906. According to at least one non-limiting exemplary embodiment, the operator may create the CAD model using a specialized processor, executing instructions from memory, separate from the device and may be communicated to the device, using communication units 216 illustrated in FIG. 2A, via wired or wireless communication. Similarly, according to another non-limiting exemplary embodiment, the CAD model may be created by a specialized processor on the device wherein the operator may input measurements from a user interface, of user interface units 212, to generate the CAD model. In some embodiments, the CAD model may comprise a data structure or set of values corresponding to measurements by the at least one sensor at the respective default poses.

Block 910 illustrates the operator activating at least one sensor by giving input to a user interface, illustrated in FIG. 7A, corresponding to at least one sensor the operator desires to calibrate. The device collects and stores the sensor data for later determination of a difference value used for calibrating at least one sensor as illustrated in FIG. 8.

Figure 9B:
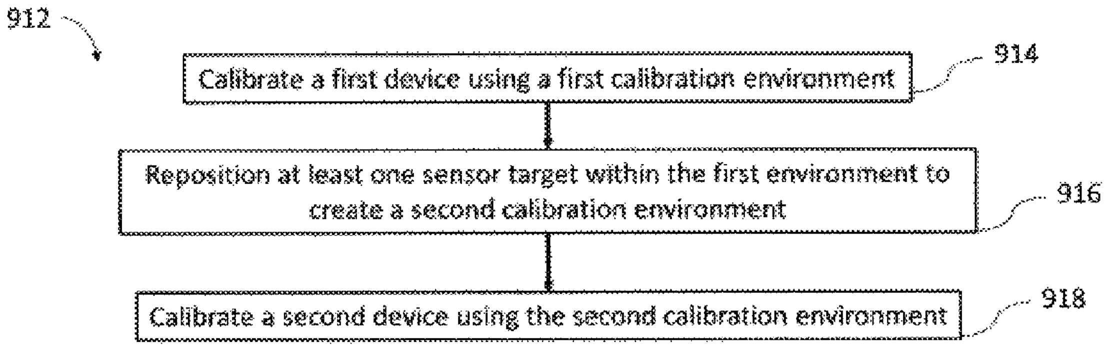
FIG. 9B is a process flow diagram of an exemplary method for an operator to calibrate different robots within the same calibration room by changing the calibration environment.

FIG. 9B is a process flow diagram illustrating an exemplary method 912 for an operator, operating a calibration environment, to calibrate at least two different devices comprising different physical properties such as, but not limited to, sensor locations, sensor types, number of sensors, size, and/or shape according to an exemplary embodiment. As stated above, a calibration environment 100 comprises the physical space and/or location of a calibration environment wherein a calibration environment comprises a specific geometry of sensor targets within the calibration environment 100.

Block 914 illustrates the operator calibrating a first device in a first calibration environment, the first device comprising at least one sensor to be calibrated using methods illustrated in FIG. 9A. Additionally, the first calibration environment comprises a first geometry of sensor targets 102, 104, 106, 108, 110, and/or 112 and a fixed point 116 illustrated in FIGS. 1A-E.

Block 916 illustrates the operator repositioning at least one sensor target within the first calibration environment to create a second calibration environment to calibrate the second device, the second calibration environment comprising a different geometry of sensor targets from the first. Repositioning the sensor targets by the operator may comprise removing, exchanging, adding, moving, and/or rotating at least one sensor target within the first calibration environment to create the second calibration environment such that the second device's sensors may be calibrated from the repositioned targets. The sensor targets of the second environment may comprise any of sensor targets 102, 104, 106, 108, 110, and/or 112 as illustrated in FIG. 1 and may be positioned using methods illustrated in block 902 of FIG. 9A. According to at least one non-limiting exemplary embodiment, both the first and second calibration environments may comprise the same fixed point 116 and rear locking mechanisms 114, 118, and/or 120 illustrated in FIG. 1D.

Block 918 illustrates an operator calibrating the second device using the second calibration environment created in block 916 using methods illustrated in FIG. 9A. It is appreciated by one of ordinary skill in the art that the exemplary method 912 may be continued for further calibration of a third device using a third calibration environment, and so on.

FIG. 10 illustrates an apparatus used by controller 222 to adjust a pose of a sensor 1006 based on a calibration reading, according to an exemplary embodiment. As illustrated in FIG. 10, sensor 1006 may be a planar LIDAR wherein adjusting screws 1004 may adjust the plane of the planar LIDAR along yaw, pitch, and/or roll axis. Controller 222, based on a calibration measurement, may generate an adjustment signal, as previously illustrated in FIG. 8, comprising adjustments to the screws 1004 to be made by correction motors 1002. Correction motors 1002 may comprise some, none, different, or all of the features of actuator units 208 previously illustrated in FIG. 2A and may be configured to adjust corresponding screws 1004 based on the adjustment signal received from controller 222. Correction motors 1002 may be configured to tighten or loosen a corresponding screw 1004 by an amount calculated by controller 222 executing specialized algorithms based on the adjustment signal, causing the plane of the planar LIDAR sensor to be adjusted.

According to at least one non-limiting exemplary embodiment, correction motor 1002 may modify the position of a sensor by providing mechanical input to a mount of the sensor to adjust the orientation of the sensor. In this exemplary embodiment, a correction motor 1002 may be configured to adjust the roll axis of the sensor wherein additional correction motors 1002 may be configured to adjust sensor along positional x, y, and z axis as well as yaw and/or pitch axis. According to at least one non-limiting exemplary embodiment, sensor 1006 may comprise any sensor, of sensor units 214 previously illustrated in FIG. 2A, adjustable by a correction motor 1002 adjusting a screw 1004 or a mounting of the sensor.

The present disclosure illustrates a system for calibrating at least one sensor on a device. The device comprises a non-transitory memory unit comprising a plurality of computer readable instructions stored thereon and at least one processor configured to execute the computer readable instructions to: transmit a signal to at least one sensor of a plurality of sensors to adjust position of at least one sensor by a value, the value corresponding to a difference between a first data set and a reference data set, the first data set corresponding to a set of coordinates generated by at least one sensor based on a respective reference target along a first path of at least one sensor, and the reference data set being stored in the memory prior to the generating of the first data set. The computer readable instructions may further cause the processor to, when executing the instructions, calculate the value by comparing a respective coordinate in the first data set with a respective coordinate in the reference data set, wherein the signal is transmitted to at least one sensor to adjust the position of at least one sensor if the value is non-zero. The computer readable instructions may further cause the processor to, when executing the instructions, receive the first data set from at least one sensor, and store the first data set by adding a plurality of columns to a pre-existing self-referential table in the non-transitory memory unit, the first data set corresponding to a plurality of respective coordinates. The computer readable instructions may further cause the processor to, when executing the instructions, receive the first data set from at least one sensor and receive a second data set from a different respective sensor of the plurality of sensors, the second data set corresponding to a set of coordinates generated by the respective sensor of the plurality of sensors based on a second reference target along a second path; wherein, the first reference target, data set, and path are different from the second reference target, data set, and path respectively and the first reference target and second reference target are spaced apart from the device.

The present disclosure further provides a method for calibrating at least one sensor on a device, the method comprising a specialized controller or processor: receiving a first data set comprising a reference data set and store the first data set in memory; receiving a second data set comprising a set of coordinates generated by at least one sensor based on a respective reference target along a first path of at least one sensor, and store the second path in the above mentioned non-transitory memory unit; calculating a value corresponding to a difference between the first and second data sets; and sending an adjustment signal comprising adjustments to at least one sensor to minimize the value. The method may further comprise the specialized controller or processor calculating the value by comparing a respective coordinate in the second data set with a respective coordinate in the reference data set, wherein the signal is transmitted to at least one sensor to adjust position of at least one sensor if the value is non-zero. The method may further comprise the specialized controller or processor calculating the value by comparing a respective coordinate in the second data set with a respective coordinate in the reference data set, wherein the signal is transmitted to at least one sensor to adjust position of at least one sensor if the value is non-zero. The method may further comprise the specialized controller or processor receiving the second data set from at least one sensor and storing the second data set by adding a plurality of columns to a pre-existing self-referential table in the non-transitory memory unit, the second data set corresponding to a plurality of respective coordinates. The method may further comprise the specialized controller or processor receiving the second data set from at least one sensor and receiving a third data set from a different respective sensor of the plurality of sensors, the third data set corresponding to a set of coordinates generated by the respective sensor of the plurality of sensors based on a third reference target along a third path; wherein, the second reference target, data set, and path differ from the second target, data set, and path respectively. Additionally, the second reference target and third reference target are spaced apart from the device.

The present disclosure further describes a plurality of instructions stored on a non-transitory computer readable storage medium, the instructions, when executed by a processing apparatus, causing the processing apparatus to transmit a signal to at least one sensor of a plurality of sensors to adjust position of at least one sensor by a value, the value corresponding to a difference between a first data set and a reference data set, the first data set corresponding to a set of coordinates generated by at least one sensor based on a respective reference target along a first path of at least one sensor, and the reference data set being stored in the memory prior to the generating of the first data set. The non-transitory computer readable storage medium further comprises instructions that cause the processing apparatus to calculate the value by comparing a respective coordinate in the first data set with a respective coordinate in the reference data set, wherein the signal is transmitted to at least one sensor to adjust position of at least one sensor if the value is non-zero. The non-transitory computer readable storage medium further comprises instructions that cause the processing apparatus to receive the first data set from at least one sensor and store the first data set by adding a plurality of columns to a pre-existing table in the memory, the first data set corresponding to a plurality of respective coordinates. The non-transitory computer readable storage medium further comprises instructions that cause the processing apparatus to receive the first data set from at least one sensor and receive a second data set from a different respective sensor of the plurality of sensors, the second data set corresponding to a set of coordinates generated by the respective sensor of the plurality of sensors based on a second reference target along a second path; wherein, the first reference target, data set, and path are different from the second reference target, data set, and path respectively. Additionally, the first reference target and second reference target are spaced apart from the device.

Lastly, the present disclosure further provides a method for operating a calibration environment for calibrating at least one sensor on a device, comprising an operator positioning at least one target along a path of at least one sensor, measuring the position and orientation of at least one target within the calibration environment, designating a fixed pint within the calibration environment wherein the device will be positioned during the calibration testing, creating a CAD reference model of the calibration environment comprising the measured positions of at least one target at the fixed point, activating at least one sensor, and collecting data for later determination of a difference value between the sensor data and the CAD reference data corresponding to the position and orientation of at least one target. The method for operating a calibration environment further comprises repositioning and/or replacing at least one sensor target within the calibration environment to facilitate the calibration of different sensors and different devices.

It will be recognized that while certain aspects of the disclosure are described in terms of a specific sequence of steps of a method, these descriptions are only illustrative of the broader methods of the disclosure and may be modified as required by the application. Certain steps may be rendered unnecessary or optional under certain circumstances. Additionally, certain steps or functionality may be added to the disclosed implementations, or the order of performance of two or more steps permuted. All such variations are encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated for carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art of practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A system for calibrating sensors on a device, comprising:
- a surface for fixing the device in a secure and stationary position,
- a target positioned away from the surface, the target comprising a plurality of shapes thereon;
- at least one sensor, coupled to the device, configured to recognize the target; and
- at least one processor configured to execute computer readable instructions to:
  - capture a measurement of the target, the measurement comprises detecting the plurality of shapes on the target by the at least one sensor,
  - compare the measurement of the target to a reference measurement of the target,
  - calculate a difference between the captured measurement and the reference measurement, the reference measurement being measured by a calibrated sensor, the calibrated sensors being different from the at least one sensor, and
  - determine a transformation value to the captured measurement, wherein the transformation value when applied to the captured measurement causes the difference between the captured measurement and the reference measurement to be minimized;
  - produce two or more degenerate pose solutions for the sensor based on the difference; and
  - omit one or more of the two or more pose solutions based on the solution yielding a transform which is larger than a threshold value along at least one translational (x, y, z) or rotational (yaw, pitch, roll) axis of the at least one sensor,
  - wherein data collected by the at least one sensor is adjusted based on applying of the transformation value.

2. The system of claim 1, wherein the plurality of shapes are arranged in an asymmetrical pattern.

3. The system of claim 1, wherein the at least one processor is further configured to execute the computer readable instructions to:

localize each of the plurality of shapes with a point approximating a center point for each respective shape, wherein the difference is calculated by comparing center points for each of the plurality of shapes on the target with a different set of center points for a different set of the plurality of shapes in a reference target.

4. The system of claim 3, wherein the respective shapes of the target are symmetrical.

5. A method for calibrating sensors on a device, comprising:

mounting the device in a secured and stationary position on a surface;

positioning a target away from the surface, the target comprising a plurality of shapes thereon;

recognizing the target by at least one sensor, coupled to the device;

capturing a measurement of the target, the measurement comprises detecting the plurality of shapes on the target by the at least one sensor;

comparing the measurement of the target to a reference measurement of the target;

calculating a difference between the captured measurement and the reference measurement, the reference measurement being measured by a calibrated sensor, the calibrated sensors being different from the at least one sensor; and determining a transformation value to the captured measurement, wherein, the transformation value when applied to the captured measurement causes the difference between the captured measurement and the reference measurement to be minimized, and data collected by the at least one sensor is adjusted based on applying of the transformation value;

producing two or more degenerate pose solutions for the sensor based on the difference; and omitting one or more of the two or more pose solutions based on the solution yielding a transform which is larger than a threshold value along at least one translational (x, y, z) or rotational (yaw, pitch, roll) axis of the at least one sensor.

6. The method of claim 5, wherein the plurality of shapes are arranged in an asymmetrical pattern.

7. The method of claim 5, further comprising:

localizing each of the plurality of shapes with a point approximating a center point for each respective shape; and wherein the calculating of the difference is performed by comparing center points for each of the plurality of shapes on the target with a different set of center points for a different set of the plurality of shapes in a reference target.

8. The method of claim 7, wherein the respective shapes of the target are symmetrical.

9. A non-transitory computer readable medium having a plurality of computer readable instructions stored thereon, that when executed by at least one processor, configure the at least one processor to:

capture a measurement of a target, the measurement comprises detecting a plurality of shapes on the target by at least one sensor coupled to a device, the device is positioned in a secure and stationary position on a surface and away from the target;

compare the measurement of the target to a reference measurement of the target;

calculate a difference between the captured measurement and the reference measurement, the reference measurement being measured by a calibrated sensor, the calibrated sensors being different from the at least one sensor, and determine a transformation value to the captured measurement, wherein the transformation value when applied to the captured measurement causes the difference between the captured measurement and the reference measurement to be minimized;

produce two or more degenerate pose solutions for the sensor based on the difference; and omit one or more of the two or more pose solutions based on the solution yielding a transform which is larger than a threshold value along at least one translational (x, y, z) or rotational (yaw, pitch, roll) axis of the at least one sensor;

wherein data collected by the at least one sensor is adjusted based on applying of the transformation value.

10. The non-transitory computer readable medium of claim 9, wherein the plurality of shapes are arranged in an asymmetrical pattern.

11. The non-transitory computer readable medium of claim 9, wherein the at least one processor is further configured to:

localize each of the plurality of shapes with a point approximating a center point for each respective shape, and wherein the difference is computed by comparing center points for each of the plurality of shapes on the target with a different set of center points for a different set of the plurality of shapes in a reference target.

12. The non-transitory computer readable medium of claim 11, wherein the respective shapes of the target are symmetrical.

* * * * *